United States Patent
Lubbers et al.

(10) Patent No.: US 7,770,247 B2
(45) Date of Patent: Aug. 10, 2010

(54) BRAKE SYSTEM FOR WALL ARM

(75) Inventors: David P. Lubbers, Cincinnati, OH (US);
Paul R. Weil, Lawrenceburg, IN (US);
D. Scott Manlove, Osgood, IN (US);
Brian J. Hoffman, Lawrenceburg, IN (US); Christian H. Reinke, York, SC (US); Jonathan D. Turner, Dillsboro, IN (US); Stephen R. Hamberg, Cincinnati, OH (US)

(73) Assignee: Hill-Rom Services, Inc., WIlmington, DE (US)

( * ) Notice: Subject to any disclaimer, the term of this patent is extended or adjusted under 35 U.S.C. 154(b) by 959 days.

(21) Appl. No.: 11/414,868

(22) Filed: May 1, 2006

(65) Prior Publication Data
US 2007/0007418 A1    Jan. 11, 2007

Related U.S. Application Data

(60) Provisional application No. 60/676,772, filed on May 2, 2005.

(51) Int. Cl.
*A61G 7/00* (2006.01)
*B60T 13/74* (2006.01)
*F16D 65/27* (2006.01)
*F16L 3/22* (2006.01)

(52) U.S. Cl. .................. 5/600; 248/282.1; 248/326; 188/171

(58) Field of Classification Search .............. 5/600, 5/81.1 R, 658, 503.1, 904, 905; 248/282.1, 248/317, 323, 324, 326; 52/27, 36.4; 137/355.16; 188/72.9, 161, 163, 171, 28, 72.1
See application file for complete search history.

(56) References Cited

U.S. PATENT DOCUMENTS

| | | | | |
|---|---|---|---|---|
| 2,560,884 A | | 7/1951 | Nagourney | |
| 3,213,877 A | * | 10/1965 | May et al. | 137/355.16 |
| 3,431,937 A | * | 3/1969 | Hettlinger et al. | 137/355.16 |
| 3,556,455 A | * | 1/1971 | Storm et al. | 248/333 |
| 4,032,775 A | * | 6/1977 | Bobrick et al. | 362/426 |

(Continued)

FOREIGN PATENT DOCUMENTS

DE    2 061 662    6/1972

(Continued)

OTHER PUBLICATIONS

The ondaScope® ceiling suspension stand, Modular design, Flexibility, Ondal Industrietechnik GmbH brochure, Jul. 11, 1996.

*Primary Examiner*—Robert G Santos
(74) *Attorney, Agent, or Firm*—Barnes & Thornburg LLP

(57) ABSTRACT

An arm is pivotally coupled to a support structure at one end and a patient care equipment support, such as a service head, is pivotally coupled to the arm at the other end. The arm has a first portion and a second portion coupled to the first portion for extension and retraction relative to the first portion. Brakes are provided to brake the extension and retraction of the portions of the arm, to brake the pivoting movement of the arm relative to the support structure, and to brake the pivoting movement of the patient care equipment support relative to the arm. Each of the brakes is releasable.

37 Claims, 13 Drawing Sheets

U.S. PATENT DOCUMENTS

| | | | |
|---|---|---|---|
| 4,185,801 A | | 1/1980 | Plymoth |
| 4,307,672 A | | 12/1981 | Shikimi |
| 4,475,322 A | | 10/1984 | Russo et al. |
| 4,487,389 A | | 12/1984 | Ziegler |
| 4,517,632 A | * | 5/1985 | Roos .......................... 362/389 |
| 4,548,373 A | | 10/1985 | Komura |
| 4,673,154 A | * | 6/1987 | Karapita ..................... 248/320 |
| 4,687,167 A | | 8/1987 | Skalka et al. |
| 4,742,980 A | | 5/1988 | Heigl |
| 4,795,122 A | * | 1/1989 | Petre .......................... 248/317 |
| 4,836,478 A | | 6/1989 | Sweere |
| 4,901,967 A | * | 2/1990 | Petre .......................... 248/327 |
| 4,993,683 A | | 2/1991 | Kreuzer |
| 4,997,155 A | | 3/1991 | Reuter et al. |
| 5,026,017 A | | 6/1991 | Kreuzer |
| 5,037,267 A | | 8/1991 | Warner et al. |
| 5,040,765 A | | 8/1991 | Schonfelder |
| 5,072,906 A | * | 12/1991 | Foster ..................... 248/122.1 |
| 5,108,064 A | | 4/1992 | Kreuzer |
| 5,126,928 A | | 6/1992 | Hughes |
| 5,240,218 A | * | 8/1993 | Dye ......................... 248/330.1 |
| 5,288,277 A | * | 2/1994 | Kummerfeld ............... 474/198 |
| 5,299,338 A | * | 4/1994 | Foster ........................... 5/658 |
| 5,306,109 A | | 4/1994 | Kreuzer et al. |
| 5,375,049 A | | 12/1994 | Witt |
| 5,377,371 A | * | 1/1995 | Foster ....................... 5/503.1 |
| 5,396,673 A | | 3/1995 | Foster |
| 5,398,359 A | * | 3/1995 | Foster ........................... 5/658 |
| 5,452,807 A | | 9/1995 | Foster et al. |
| 5,455,975 A | | 10/1995 | Foster |
| 5,480,212 A | | 1/1996 | Marconet |
| 5,490,652 A | | 2/1996 | Martin |
| 5,527,125 A | | 6/1996 | Kreuzer et al. |
| 5,560,583 A | | 10/1996 | Holmgren |
| 5,618,090 A | | 4/1997 | Montague et al. |
| 5,655,741 A | | 8/1997 | Watkins |
| 6,095,468 A | * | 8/2000 | Chirico et al. ............ 248/282.1 |
| 6,196,649 B1 | * | 3/2001 | Block et al. .................. 312/209 |
| 6,364,268 B1 | | 4/2002 | Metelski |
| 6,817,585 B2 | | 11/2004 | Wagner et al. |
| 7,040,057 B2 | | 5/2006 | Gallant et al. |
| 7,065,811 B2 | | 6/2006 | Newkirk et al. |
| 7,065,812 B2 | * | 6/2006 | Newkirk et al. ................. 5/600 |
| 7,216,382 B2 | * | 5/2007 | Newkirk et al. ................. 5/600 |
| 7,254,850 B2 | * | 8/2007 | Newkirk et al. ................. 5/600 |
| 7,418,749 B2 | * | 9/2008 | Graham et al. ............... 5/503.1 |
| 2004/0164220 A1 | * | 8/2004 | Newkirk ..................... 248/647 |
| 2004/0199996 A1 | | 10/2004 | Newkirk et al. |
| 2005/0000019 A1 | * | 1/2005 | Newkirk et al. ................. 5/600 |
| 2006/0207025 A1 | * | 9/2006 | Newkirk et al. ................. 5/600 |
| 2006/0207026 A1 | * | 9/2006 | Newkirk et al. ................. 5/600 |
| 2006/0226333 A1 | * | 10/2006 | Newkirk ..................... 248/647 |
| 2006/0242763 A1 | * | 11/2006 | Graham et al. ............... 5/503.1 |
| 2007/0007418 A1 | * | 1/2007 | Lubbers et al. ............. 248/326 |
| 2007/0067911 A1 | * | 3/2007 | Graham et al. ................. 5/600 |
| 2007/0138354 A1 | * | 6/2007 | Graham et al. ............. 248/121 |
| 2007/0187559 A1 | * | 8/2007 | Newkirk et al. .......... 248/125.8 |
| 2007/0251014 A1 | * | 11/2007 | Newkirk et al. ................ 5/658 |

FOREIGN PATENT DOCUMENTS

| | | |
|---|---|---|
| DE | 31 00 819 A1 | 7/1982 |
| DE | 37 01 172 A1 | 7/1988 |
| DE | 93 09 467.1 U1 | 11/1993 |
| DE | 93 10 102.3 U1 | 11/1993 |
| WO | WO 87/07688 A1 | 12/1987 |
| WO | WO 98/33419 A1 | 8/1998 |
| WO | WO 2005/037166 A2 | 4/2005 |

* cited by examiner

BRAKE SYSTEM FOR WALL ARM

CROSS REFERENCE TO RELATED APPLICATION

This application claims the benefit, under 35 U.S.C. §119(e), of U.S. Provisional Patent Application No. 60/676,772, filed May 2, 2005, which is hereby expressly incorporated by reference herein.

BACKGROUND OF THE INVENTION

The present disclosure relates to an arm system for supporting a service head having a plurality of service connectors, and more particularly relates to a brake system for use with such an arm system.

Hospitals often require a variety of service connectors which are readily accessible to a caregiver and which are in close proximity to a patient supported on a patient support, such as a hospital bed, a stretcher, and the like. Illustratively, such service connectors include medical gas and vacuum outlets, data ports, electrical outlets, telephone jacks, and the like. The service connectors are sometimes supported on a service head, which is, in turn, supported by a horizontal arm which extends outwardly from a support structure such as a wall, a ceiling, or other frame work. A plurality of service delivery lines are routed through the arm and connected to the associated service connectors.

SUMMARY OF THE INVENTION

The present invention comprises a system that has one or more of the following features or combinations thereof, which alone or in any combination may comprise patentable subject matter:

An arm system may include a first arm having a first portion and a second portion coupled to the first portion for extension and retraction relative to the first portion. The first and second portions may have a first plurality of service delivery lines routed therethrough. The arm may extend outwardly from a support structure in a hospital or a healthcare facility.

The arm system may include a first brake movable in response to a first user input between a braking position to impede the longitudinal movement of the second portion relative to the first portion and a releasing position to allow the longitudinal movement of the second portion relative to the first portion. The first brake may normally impede the longitudinal movement of the second portion relative to the first portion. The first brake may be movable to the releasing position in response to the first user input to allow longitudinal movement of the second portion relative to the first portion.

The first portion may have a proximal end coupled to the support structure to pivot about a first axis. The arm system may include a second brake movable in response to the first user input, or in response to another user input, between a braking position to impede the pivoting movement of the first arm and a releasing position to allow the pivoting movement of the first arm. The first and second brakes may normally impede the longitudinal movement of the second portion relative to the first portion and the pivoting movement of the first arm about the first axis. The first and second brakes may be movable to their respective releasing positions in response to the first user input to allow both the longitudinal movement of the second portion relative to the first portion and the pivoting movement of the first arm about the first axis. Separate user inputs to release the first and second brakes separately may be provided in some embodiments.

The arm system may include a first service head coupled to the second portion for longitudinal movement therewith and to pivot about a second axis. The arm system may include a third brake movable in response to the first user input, or in response to another user input, between a braking position to impede the pivoting movement of the first service head about the second axis and a releasing position to allow the pivoting movement of the first service head about the second axis. The first service head may include a plurality of service connectors coupled to the associated service delivery lines routed through the first arm.

The first, second and third brakes may normally impede the longitudinal movement of first service head and the pivoting movement of the first arm about the first axis and the first service head about the second axis. The first, second and third brakes may be movable to their respective releasing positions in response to the first user input to allow the longitudinal movement of the first service head and the pivoting movement of the first arm about the first axis and the first service head about the second axis. Separate user inputs to release the first, second, and third brakes separately may be provided in some embodiments. The arm system may include a brake controller that signals the first, second and third brakes to move to their respective releasing positions in response to the actuation of one or more brake release switches mounted on the first service head.

The first and second axes may each extend generally vertically. In some embodiments, one or more user inputs are provided by one or more user input devices mounted on a wall adjacent to the arm system. In some embodiments, one or more user inputs are provided by a wireless user input device. The first plurality of service delivery lines may include any one or more of the following: electrical power lines of all types, data lines of all types, control signal lines of all types, medical gas lines of all types and vacuum lines of all types.

The arm system may include a second arm having a proximal end coupled to the support structure to pivot about a third axis. In some embodiments, the third axis is substantially coincident with the first axis. The arm system may include a fourth brake movable in response to a second user input between a braking position to impede the pivoting movement of the second arm about the third axis and a releasing position to allow the pivoting movement of the second arm about the third axis. The second arm may have a second plurality of service delivery lines routed therethrough.

The arm system may include a second service head coupled to a distal end of the second arm to pivot about a fourth axis. The arm system may include a fifth brake movable in response to the second user input, or in response to another user input, between a braking position to impede the pivoting movement of the second service head about the fourth axis and a releasing position to allow the pivoting movement of the second service head about the fourth axis. The second service head may include a plurality of service connectors coupled to the associated service delivery lines routed through the second arm.

The second arm may include a first portion and a second portion coupled to the first portion for extension and retraction relative to the first portion. The arm system may include a sixth brake movable in response to the second user input, or in response to another user input, between a braking position to impede the longitudinal movement of the second portion relative to the first portion and a releasing position to allow the longitudinal movement of the second portion relative to the first portion.

The fourth, fifth, and sixth brakes may normally impede the longitudinal movement of second service head and the pivoting movement of the second arm about the third axis and the second service head about the fourth axis. The fourth, fifth, and sixth brakes may be movable to their respective releasing positions in response to the second user input to allow the longitudinal movement of the second service head and the pivoting movement of the second arm about the third axis and the second service head about the fourth axis. Separate user inputs to release the fourth, fifth, and sixth brakes separately may be provided in some embodiments.

The third and fourth axes may each extend generally vertically. In some embodiments, one or more user inputs are provided by one or more user input devices mounted on a wall adjacent to the arm system. In some embodiments, one or more user inputs are provided by a wireless user input device. The second plurality of service delivery lines may include any one or more of the following: electrical power lines of all types, data lines of all types, control signal lines of all types, medical gas lines of all types and vacuum lines of all types.

An arm system may include a first arm having a proximal end coupled to a support structure to pivot about a first axis and a second arm having a proximal end coupled to the support structure below the first arm to pivot about a second axis. In some embodiments, the second axis is substantially coincident with the first axis. A first plurality of service delivery lines may be routed, in part, downwardly through the support structure and then outwardly through the first arm. A second plurality of service delivery lines may be routed, in part, upwardly through the support structure and then outwardly through the second arm.

The support structure may include a first downwardly-extending pivot and a second upwardly-extending pivot. The proximal end of the first arm may be coupled to the first downwardly-extending pivot to pivot about the first axis. The first plurality of service delivery lines may be routed downwardly through the first downwardly-extending pivot and then outwardly through the first arm. The proximal end of the second arm may be coupled to the second upwardly-extending pivot to pivot about the second axis. The second plurality of service delivery lines may be routed upwardly through the second upwardly-extending pivot and then outwardly through the second arm.

Additional features, which alone or in combination with any other feature(s), such as those listed above, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which.

DETAILED DESCRIPTION OF THE DRAWINGS

Figure 1:
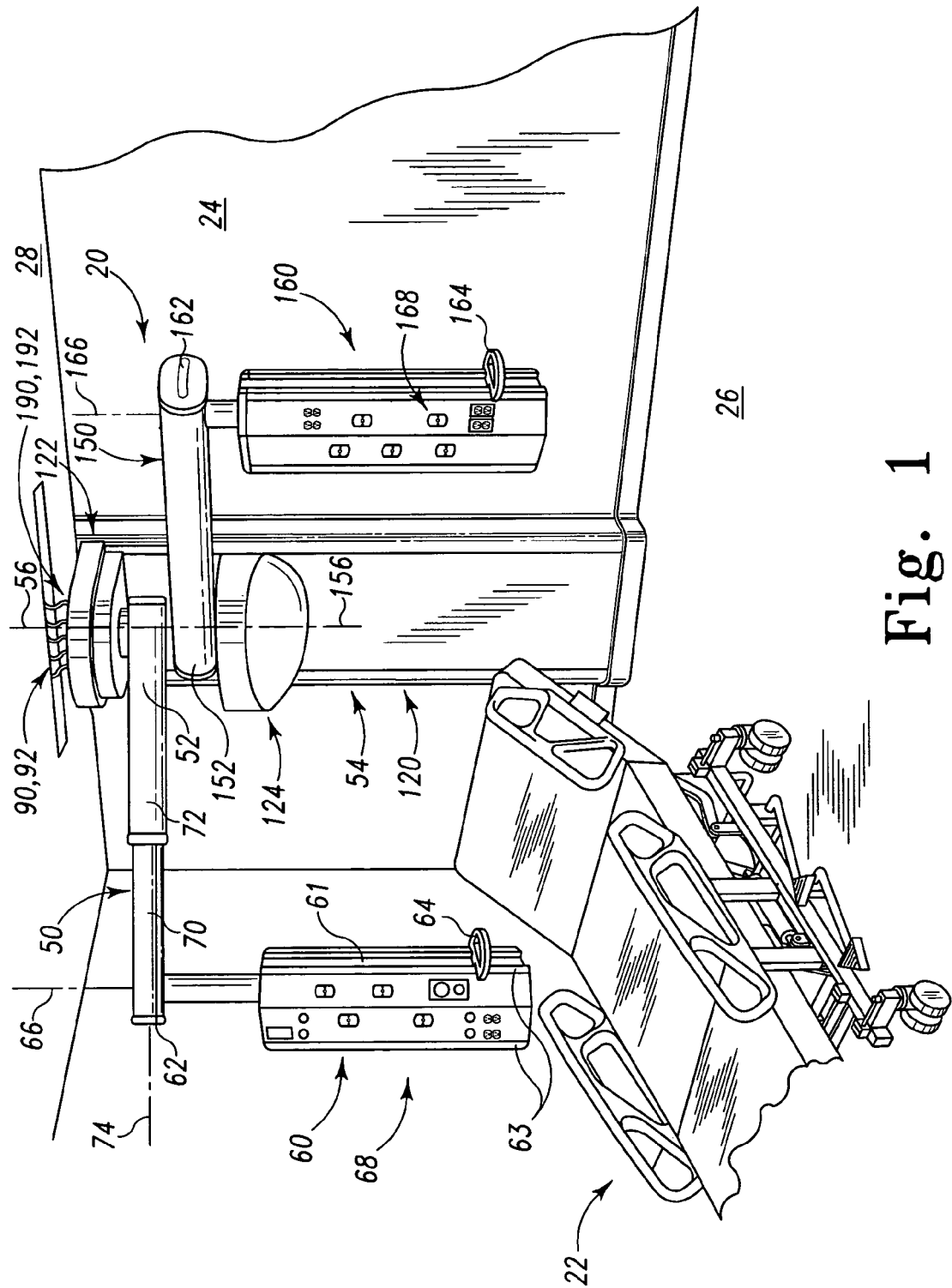
FIG. 1 is a perspective view of a wall arm system positioned next to a hospital bed, showing the wall arm system including a support structure, an upper telescopic arm pivotally coupled to the support structure at one end and carrying a service head having a plurality of service connectors at the other end, and a lower non-telescopic arm pivotally coupled to the support structure at one end below the first arm and carrying a service head having a plurality of service connectors at the other end.
Figure 2:
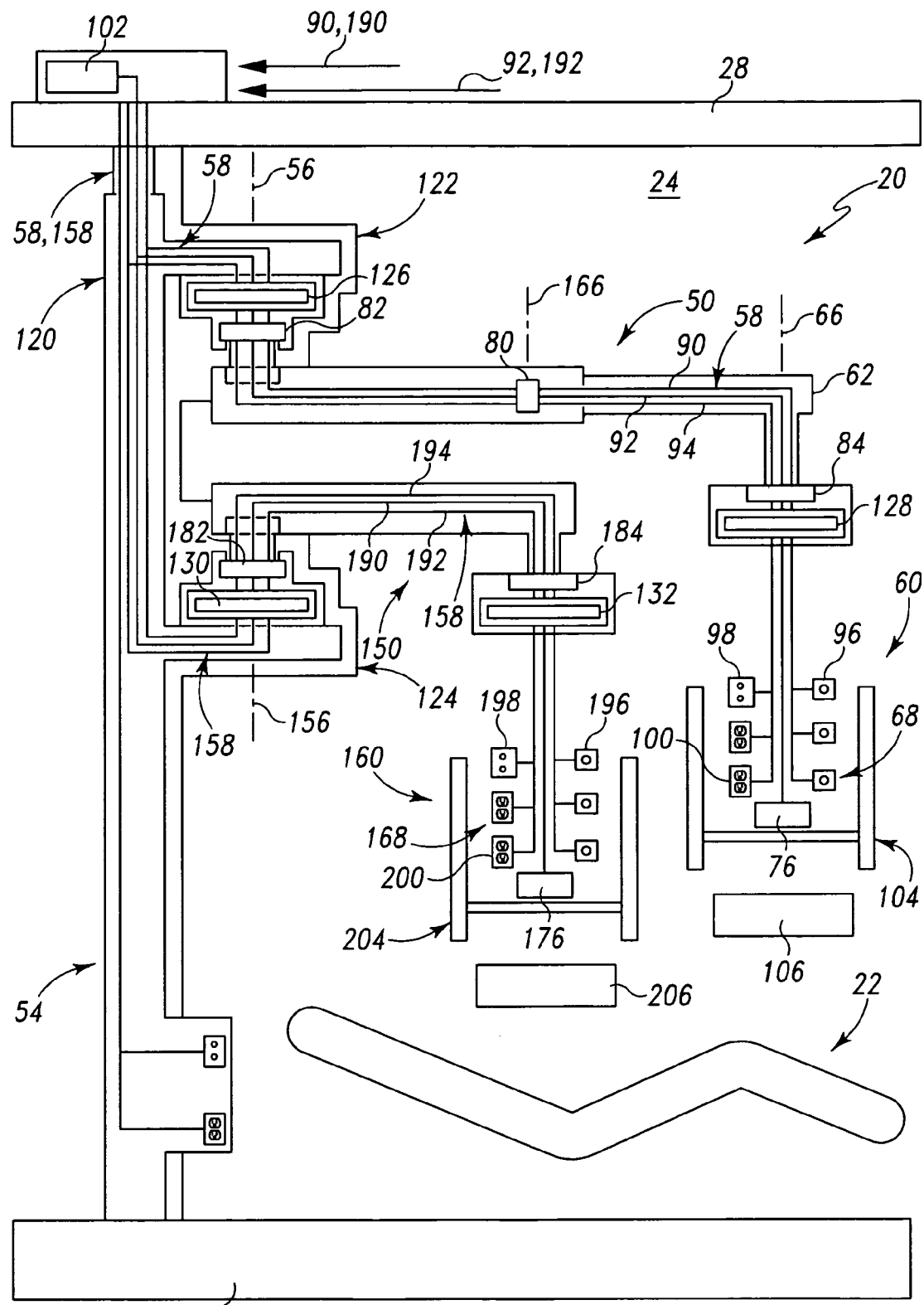
FIG. 2 is a diagrammatic view of the FIG. 1 wall arm system.

FIGS. 1 and 2 show a wall arm system 20 and a hospital bed 22 positioned next to the wall arm system 20. The wall arm system 20 is located in a patient room 24 of a hospital or a healthcare facility. Although a hospital bed is shown in the illustrated embodiment, the wall arm system 20 may very well be used with a stretcher, an operating table, a chair bed, an ambulatory care chair, and the like. Also, the wall arm system 20 may be used in different settings such as, for example, intensive care rooms, operating rooms, and physician offices.

The arm system 20 includes a first or upper telescopic arm 50 having a proximal end 52 coupled to a support structure 54 to pivot about a first generally-vertical axis 56. A first plurality of service delivery lines 58 are routed through the upper arm 50. A first service head 60 is coupled to a distal end 62 of the upper arm 50 to pivot about a second generally-vertical axis 66. The service head 60 includes a first plurality of service connectors 68 connected to the associated service delivery lines 58 routed through the upper arm 50. The upper arm 50 is sometimes referred to as the radial or top-mounted telescopic arm 50.

As shown in FIG. 1, the service head 60 includes a first plurality of accessory tracks 104 for supporting patient care equipment, such as infusion pumps, monitors, hooks for IV bags, accessory baskets, bottle slides, and the like. The accessory tracks 104 include one accessory track 61 of a first-type and four accessory tracks 63 of a second-type. The first-type track 61 is located on a front side of the service head 60 and two second-type tracks 63 are located on each of the two opposite sides of the service head 60. A somewhat D-shaped handle 64 is coupled to the first-type track 61 to adjust the position of the service head 60 and/or the upper arm 50 after releasing a set of brakes 80, 82, 84 holding the arm 50 and the service head 60 in place. Thus, the service head 60 serves as a patient care equipment support to which a variety of patient care equipment, such as IV pumps, ventilators, heart monitors and the like, are couplable. In some embodiments contemplated by this disclosure, the service head 60 does not have service connectors 68 and the lines 58 are not routed through the arm 50. In some embodiments, the first-type accessory track 61 is a GCX-type track and the second-type accessory track 63 is a Hill-Rom profile or AP (Architectural Products) accessory track. In other embodiments, tracks with different configurations and sizes are be used.

The arm system 20 includes a second or lower non-telescopic arm 150 having a proximal end 152 coupled to the support structure 54 below the upper arm 50 to pivot about a third generally-vertical axis 156. A second plurality of service delivery lines 158 are routed through the lower arm 150. A second service head 160 is coupled to a distal end 162 of the lower arm 150 to pivot about a fourth generally-vertical axis 166. The service head 160 includes a plurality of service connectors 168 connected to the associated service delivery lines 158 routed through the lower arm 150. The service head 160 includes a second plurality of accessory tracks 204 for supporting patient care equipment. A somewhat D-shaped handle 164 is coupled to the first-type track to adjust the position of the service head 160 and/or the lower arm 150 after releasing a set of brakes 182, 184 holding the arm 150 and the service head 160 in place. The lower arm 150 is sometimes referred to as the radial or bottom-mounted arm 150.

Certain terminology will be used in the following description for convenience and reference only, and will not be limiting. For example, the words "upwardly", "downwardly", "rightwardly" and "leftwardly" will refer to directions in the drawings to which reference is made unless specified otherwise. The words "inwardly" and "outwardly" will refer to directions toward and away from, respectively, the geometric center of any referred-to object, such as the arms 50, 150, to which the reference is made. Such terminology will include the words specifically mentioned above, derivatives thereof, and words of similar import.

The upper arm 50 is longer than the lower arm 150. The upper arm 50 is telescopic while the lower arm 150 is fixed in length or non-telescopic. The pivotal-mounting of the arms 50, 150 to the support structure 54 and the pivotal-mounting of the service heads 60, 160 to the respective arms 50, 150 permits the service heads 60, 160 to be accessible from a wide range of locations in the hospital room 24. The telescoping of the upper arm 50 provides additional flexibility in positioning the first service head 60. Also, the telescoping of the upper arm 50 allows the upper arm 50 and the service head 60 to pass around the lower arm 150 and the service head 160. This allows the upper arm 50 to be positioned on either side of the lower arm 150, thereby giving the caregiver greater flexibility in setting up the patient care equipment about a patient. Illustratively, the longer arm 50 is positioned vertically above the shorter arm 150, facilitating movement of the arms 50, 150 past each other. The arms 50, 150 are constructed of aluminum extrusions in some embodiments.

In the embodiment illustrated in FIGS. 1 and 2, the main pivot axes 56, 156 of the first and second arms 50 and 150 are substantially vertically aligned. In other embodiments, the pivot axes 56, 156 are offset. In the embodiment illustrated in FIG. 1, the upper arm 50 is telescopic and the lower arm 150 is non-telescopic. In other embodiments, both arms 50, 150 are telescopic. In still other embodiments, both arms 50, 150 are non-telescopic. In some embodiments, the upper arms 50 is non-telescopic and the lower arm 150 is telescopic. Both the upper and lower arms 50, 150 can turn between 160° and 190° around the respective pivot axes 56, 156. The upper telescopic arm 50 can extend from 41.5 inches to about 64 inches.

The support structure 54 illustrated in FIGS. 1 and 2 extends between a floor 26 and a ceiling 28 of the hospital room 24. Alternatively, the support structure 54 may extend upwardly from the floor 26 or downwardly from the ceiling 28 or outwardly from a wall 30 of the patient room 24. Also, the support structure 54 may be built into the ceiling 28 or the wall 30 or it may jut outwardly from the wall 30. An illustrative support structure for radial arms is disclosed in a PCT Patent Application Ser. No. US2004/33648 (PCT Publication No. WO2005/037166), filed Oct. 12, 2004, which is hereby incorporated herein by reference. While the illustrative arms 50, 150 are horizontal structures, this disclosure also contemplates non-horizontal structures.

Figure 4:
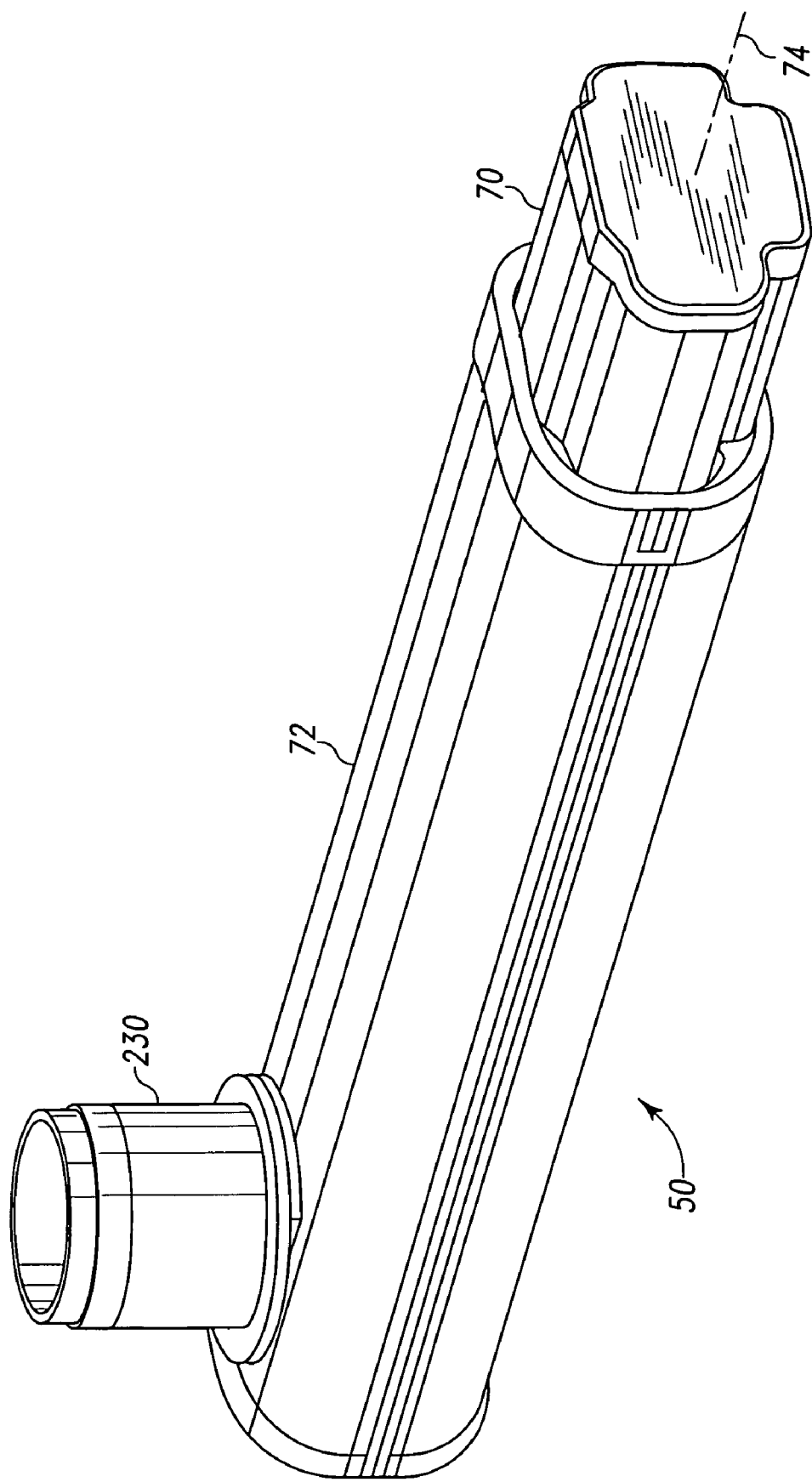
FIG. 4 is a front perspective view showing the upper arm having an inner tube that telescopes into and out of an outer tube that is pivotally coupled to the support structure of FIG. 1.

As shown in FIG. 4, the upper arm 50 has an inner tube or portion 70 that telescopes into and out of an outer tube or portion 72 along a generally-horizontal longitudinal axis 74 of the outer tube 72. While the illustrative inner portion 70 extends and retracts telescopically relative to the outer portion 72, in other embodiments, the extension and retraction may occur without one portion of an arm being received telescopically in another portion of the arm. For example, the arm may have overlapping arm portions or nesting U-shaped arm segments. The arm system 20 includes a first brake 80 movable between a braking position to impede the longitudinal movement of the inner tube 70 relative to the outer tube 72 and a releasing position to allow the longitudinal movement of the inner tube 70 relative to the outer tube 72. The arm system 20 includes a second brake 82 movable between a braking position to impede the pivoting movement of the upper arm 50 about the first axis 56 and a releasing position to allow the pivoting movement of the upper arm 50 about the first axis 56. The arm system 20 includes a third brake 84 movable between a braking position to impede the pivoting movement of the first service head 60 about the second axis 66 and a releasing position to allow the pivoting movement of the first service head 60 about the second axis 66.

In the illustrated embodiment, the first, second and third brakes 80, 82, 84 are in their respective braking positions when no power is applied. The brakes 80, 82, 84 move to their respective releasing positions in response to a user pressing and holding a brake release switch 76 (shown diagrammatically in FIG. 2) mounted on the service head 60, thereby allowing the upper arm 50 to pivot and/or telescope and allowing the service head 60 to pivot. In the illustrated embodiment, if the brake release switch 76 is pressed for a predetermined period, such as 30 seconds or longer, the power to the brakes 80, 82, 84 is interrupted so that the brakes 80, 82, 84 are reengaged into their respective braking positions. In some embodiments, separate user inputs to release the first, second, and third brakes 80, 82, 84 separately may be provided. In some other embodiments, one or more user inputs are provided by one or more user input devices mounted on a wall adjacent to the arm system 20. In other embodiments, one or more user inputs are provided by a wireless user input device (not shown).

Figure 13:
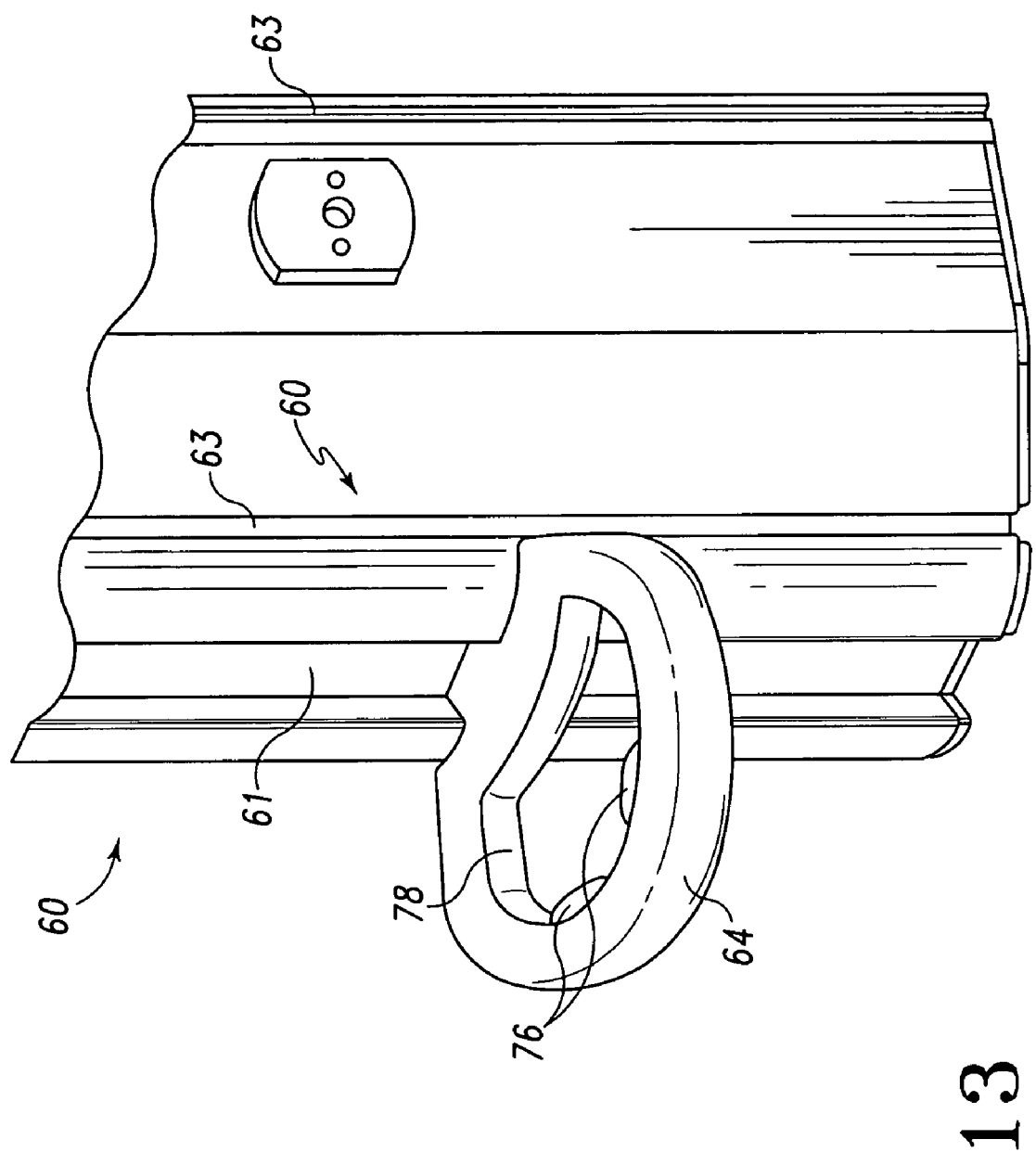
FIG. 13 is a perspective view showing a handle coupled to the service head, and a pair of brake release switches extending inwardly from the inside surface of the handle.

In the illustrated embodiment, as shown in FIG. 13, the brake release switch 76 (shown diagrammatically in FIG. 2) comprises two brake release switches 76 extending inwardly from an inside surface 78 of the D-shaped handle 64 of the service head 60. To release the brakes 80, 82, 84 and adjust the position of the service head 60 and/or the upper arm 50, the user holds the handle 64 and presses and holds either or both of the brake release switches 76 extending from the inside surface 78 of the handle 64. The user can then adjust the position of the service head 60 and/or the upper arm 50 while continuing to press and hold either or both of the brake release switches 76 on the handle 64.

As shown in FIG. 2, the arm system 20 includes a fourth brake 182 movable between a braking position to impede the pivoting movement of the lower arm 150 about the third axis 156 and a releasing position to allow the pivoting movement of the lower arm 150 about the third axis 156. The arm system 20 includes a fifth brake 184 movable between a braking position to impede the pivoting movement of the second service head 160 about the fourth axis 166 and a releasing position to allow the pivoting movement of the second service head 160 about the fourth axis 166.

In the illustrated embodiment, the fourth and fifth brakes 182, 184 are in their respective braking positions when no power is applied. The brakes 182, 184 are movable to their respective releasing positions in response to a user pressing and holding a brake release switch 176 (shown diagrammatically in FIG. 2) mounted on the service head 160, thereby allowing the lower arm 150 to pivot and allowing the service head 160 to pivot. In the illustrated embodiment, if the brake release switch 176 is pressed for 30 seconds or longer, the brakes 182, 184 are automatically reengaged. In some embodiments, separate user inputs to release the fourth and fifth brakes 182, 184 separately may be provided. In some other embodiments, one or more user inputs are provided by one or more user input devices mounted on a wall adjacent to the arm system 20. In other embodiments, one or more user inputs are provided by a wireless user input device.

In the illustrated embodiment, the brake release switch 176 (shown diagrammatically in FIG. 2) comprises two brake release switches, similar to the brake release switches 76 in FIG. 13, extending inwardly from an inside surface of the D-shaped handle 164. To release the brakes 182, 184 and adjust the position of the service head 160 and/or the lower arm 150, the user holds the handle 164 and presses and holds either or both of the brake release switches on the handle 164. The user can then adjust the position of the service head 160 and/or the lower arm 150 while continuing to press and hold either or both of the brake release switches.

The second and fourth brakes 82, 182 impeding the pivoting movement of the arms 50, 150 about the respective pivot axes 56, 156 are similar in construction. The third and fifth brakes 84, 184 impeding the pivoting movement of the service heads 60, 160 about the respective pivot axes 66, 166 are similar in construction. The brakes 82, 182, 84, 184, sometimes referred to as the "pivot brakes," are shown diagrammatically in FIG. 12.

While the illustrative lower arm 150 is non-telescopic, in other embodiments, the lower arm 150 may be telescopic. In such event, the arm system 20 may include a sixth brake (not shown) movable between a braking position to impede the telescopic movement of the lower arm 150 and a releasing position to allow the telescopic movement of the lower arm.

The sixth brake may be similar in construction to the first brake 80. The brake 80 is sometimes referred to as the "telescopic brake."

As shown in FIG. 2, the first plurality of service delivery lines 58 include electrical and data lines 90, medical gas and vacuum lines 92 and control signal lines 94. The first plurality of service connectors 68 include electrical outlets 96, data ports 98, and medical gas and vacuum outlets 100. The electrical outlets 96 and data ports 98 are coupled to the associated electrical and data lines 90. The medical gas and vacuum outlets 100 are coupled to the associated medical gas and vacuum lines 92. The control signal lines 94 couple the brake release switches 76 to a brake controller 102 of the wall arm system 20. While the brake controller 102 is diagrammatically shown in FIG. 2 as located outside the support structure 54, in some embodiments, the brake controller 102 is located within the vertically-extending column portion 120 of the support structure 54.

As shown in FIG. 2, the second plurality of service delivery lines 158 include electrical and data lines 190, medical gas and vacuum lines 192 and control signal lines 194. The second plurality of service connectors 168 include electrical outlets 196, data ports 198, and medical gas and vacuum outlets 200. The electrical outlets 196 and data ports 198 are coupled to the associated electrical and data lines 190. The medical gas and vacuum outlets 200 are coupled to the associated medical gas and vacuum lines 192. The control signal lines 194 couple the brake release switch 176 to the controller 102.

The electrical lines 90, 190 supply power at a plurality of voltages that are required for operating various pieces of patient care equipment. In addition, the electrical lines 90, 190 may supply emergency power in the event of a power failure. The data lines 90, 190 carry audio, video, and information data. The medical gas lines 92, 192 supply one or more of the following: oxygen, nitrogen, nitrous oxide, air and vacuum. In addition to the accessory tracks 104, the service head 60 includes an IMD (infusion management device) interface 106 for supporting infusion management equipment, such as, for example, infusion pumps. Likewise, the service head 160 includes a plurality of accessory rails 204 and an IMD interface 206.

Figure 3:
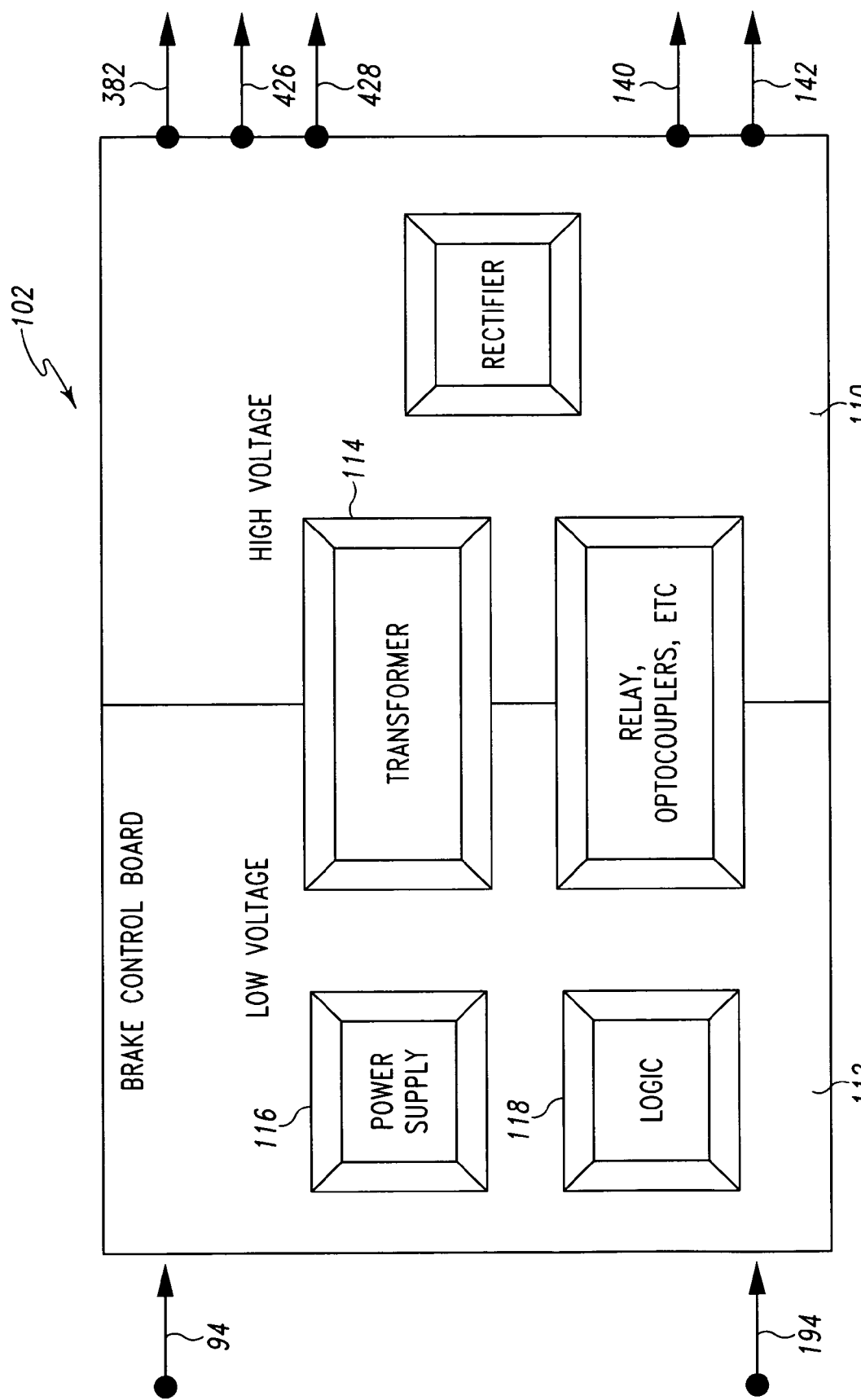
FIG. 3 is a block diagram of a brake controller of the wall arm system.

As shown in FIG. 3, the brake controller 102 includes high and low voltage portions 110, 112, respectively. A step-down transformer 114 converts the line voltage to a lower AC voltage. The low voltage AC output of the transformer 114 is coupled to a a power supply 116. The power supply 116 produces a DC voltage required for the operation of a logic circuit 118. The lead lines 94, 194 couple the respective outputs of brake release switches 76, 176 to the logic circuit 118. The logic circuit 118 provides a first brake release signal in response to the actuation of the first brake release switch 76. The logic circuit 118 provides a second brake release signal in response to the actuation of the second brake release switch 176. Lead lines 382, 426, 428 supply the first brake release signal to the brakes 80, 82, 84 of the upper arm 50. Lead lines 140, 142 supply the second brake release signal to the brakes 182, 184 of the lower arm 150.

As shown in FIGS. 1 and 2, the support structure 54 has a vertically-extending column portion 120 and upper and lower cantilevered portions 122, 124 that extend outwardly from the vertically-extending column portion 120. The lower cantilevered portion 124 is situated below the upper cantilevered portion 122. As shown in FIG. 2, a first or upper arm pivot 126 is carried by the upper cantilevered portion 122. The upper arm 50 is coupled to the upper pivot 126 for pivoting movement about the first axis 56. A second or service head pivot 128 is supported by the distal end 62 of the upper arm 50. The first service head 60 is coupled to the second pivot 128 for pivoting movement about the second axis 66. The first plurality of service delivery lines 58 are routed downwardly from the ceiling 28 through the vertically-extending column portion 120, outwardly though the upper cantilevered portion 122, downwardly though the upper arm pivot 126, outwardly though the upper telescopic arm 50, downwardly through the service head pivot 128 and then downwardly through the first service head 60 to the respective service connectors 68.

A third or lower arm pivot 130 is carried by the lower cantilevered portion 124. The lower arm 150 is coupled to the lower pivot 130 for pivoting movement about the third axis 156. A fourth or service head pivot 132 is supported by the distal end 162 of the lower arm 150. The second service head 160 is coupled to the fourth pivot 132 for pivoting movement about the fourth axis 166. As shown in FIG. 2, the second plurality of service delivery lines 158 are routed downwardly from the ceiling 28 through the vertically-extending column portion 120, outwardly though the lower cantilevered portion 124, upwardly though the lower arm pivot 130, outwardly though the non-telescopic lower arm 150, downwardly through the service head pivot 132 and then downwardly through the second service head 160 to the respective service connectors 168.

The two arm pivots 126, 130 are generally similar in construction. Only one of the two pivots 126, 130, namely, the upper arm pivot 126 is described below with reference to FIG. 10. The upper arm pivot 126 includes a thrust bearing 220 that is housed in a central hub 222 of a support casting 224 of the upper cantilevered portion 122. The casting 224 includes the central hub 222, a generally rectangular perimeter frame 226, and six ribs 228 that extend between the central hub 222 and the perimeter frame 226. The thrust bearing 220 supports a downwardly-extending pivot tube 230 for pivoting movement of the first axis 56. A lower end of the pivot tube 228 is attached to a topside of the upper arm 50 for rotation therewith about the first axis 56. A ring gear 402 is coupled to an upper end 232 of the pivot tube 230 for rotation therewith. The first plurality of the service delivery lines 58 are routed downwardly through the downwardly-extending upper pivot tube 230.

Figure 10:
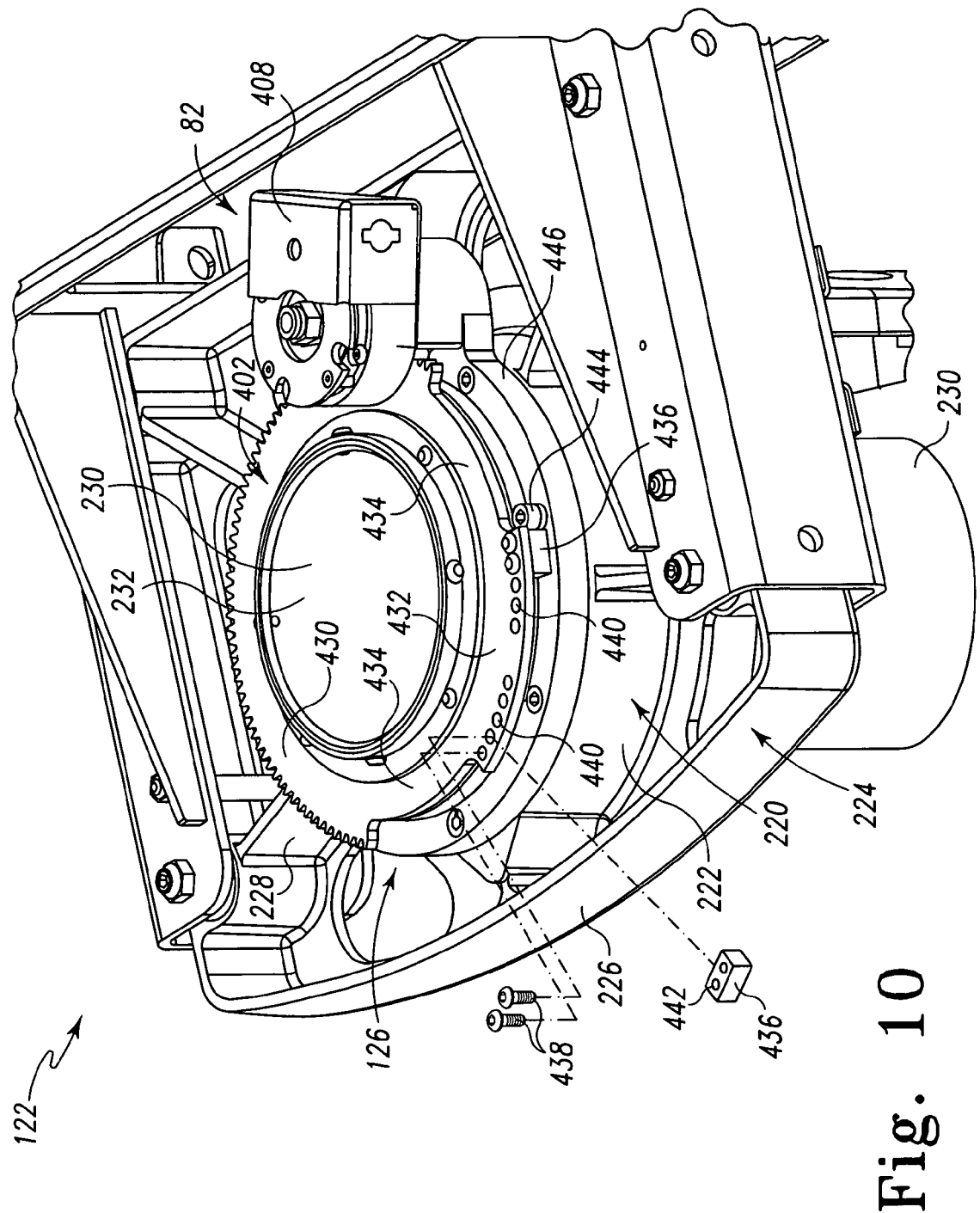
FIG. 10 is a top perspective view of an upper cantilevered portion with the cover removed, an upper arm support casting, a ring gear coupled to a pivot tube extending upwardly from the upper arm, and a second brake coupled to the ring gear to impede the pivoting movement of the upper arm relative to the upper arm support casting.
Figure 12:
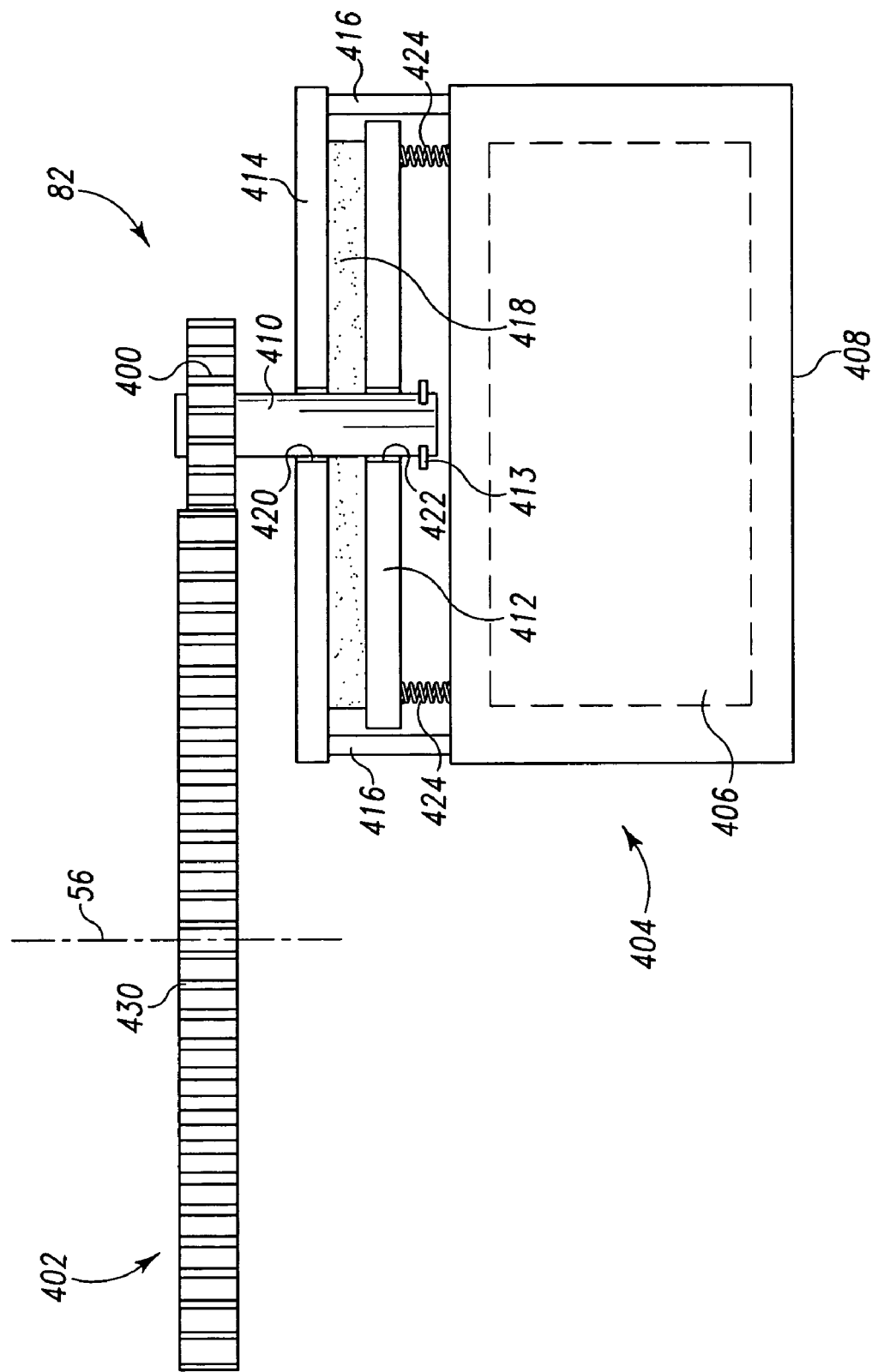
FIG. 12 is a diagrammatic view of the second and third brakes.

As shown in FIG. 10, the ring gear 402 includes a toothed segment 430, a non-toothed segment 432, and two reduced diameter segments 434 interposed between them. The toothed segment 430 of the ring gear 402 drives a pinion 400 of the upper arm brake 82 as shown in FIG. 12. Two rotational stops 436 are secured to the underside of the non-toothed segment 432 by associated screws 438. The screws 438 extend through slightly-oversized holes 440 in the non-toothed segment 432 and then threaded into respective openings 442 in the associated stops 436. The stops 436 are configured to engage respective stops 444 secured to the topside of a collar 446 that is attached to the central hub 222 of the support casting 224. Only one of the two stops 444 secured to the collar 446 is shown in FIG. 10. The holes 440 near each end of the non-toothed segment 432 provide three possible positions for each stop 436. Each position of the stop 436 adjusts the range of motion of the upper arm 50 by 5° toward that direction. The total swing range of the upper arm 50, if both stops 436 are adjusted, is about 160° minimum to about 190° maximum. Of course, the segment 432 and the stops 436 may be configured to provide for swing ranges that are less than 160° and/or more than 190° in other embodiments.

The lower arm pivot 130 includes a thrust bearing, similar to the trust bearing 220 shown in FIG. 10, that is housed in a central hub of a support casting of the lower cantilevered portion 124. The thrust bearing supports an upwardly-extending pivot tube for rotation about the second axis 156. An upper end of the pivot tube is attached to an underside of the lower arm 150 for rotation therewith about the second axis 156. A ring gear, similar to the ring gear 402 shown in FIG. 10, is coupled to a lower end of the pivot tube for rotation therewith. Two rotational stops, similar to the rotational stops 436 shown in FIG. 10, are coupled to the ring gear to limit the total swing range of the lower arm 50 between 160° minimum to 190° maximum. The second plurality of the service delivery lines 158 are routed upwardly through the upwardly-extending pivot tube. The term "tube" used in the specification and claims generally refers to a cylindrical member such as a shaft, an arbor, etc.

The service head two pivots 128, 132 are generally similar in construction. Only one of the two service head pivots 128, 132, namely, the pivot 128 is described with reference to FIG. 11, which is a bottom perspective view of the pivot 128. The pivot 128 includes a thrust bearing 236 that is housed in a central hub 238 of a support casting 240 of the service head 60. The casting 240 includes the central hub 238, a generally trapezoidal perimeter frame 242, and seven ribs 244 that extend between the central hub 238 and the perimeter frame 242. The thrust bearing 236 is supported by a pivot tube 246 that extends upwardly therefrom. An upper end of the pivot tube 246 is attached to an underside of the upper arm 50 for rotation therewith about the first axis 56. A ring gear 452 is coupled to a lower end 248 of the pivot tube 246. The ring gear 452 drives a pinion 450 as the service head 60 is pivoted about the second axis 66. The pivot tube 246 and the ring gear 452 coupled thereto do not pivot with the service head 60 as the service head 60 pivots about the second axis 66. The service head 60 moves longitudinally with the telescopic upper arm 50. In addition, the service head 60 moves in an arc as the upper arm 50 pivots about the first axis 56.

Figure 5:
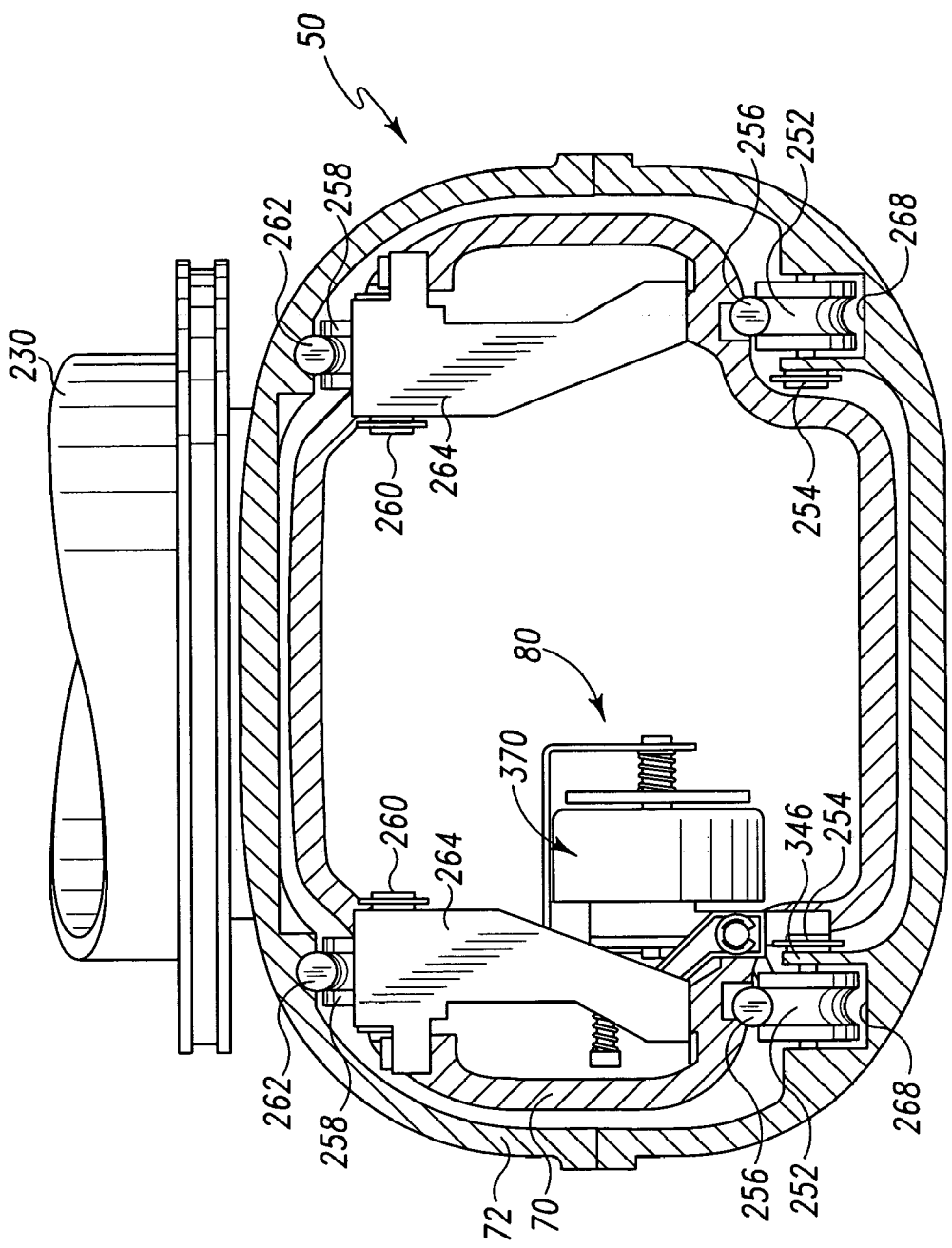
FIG. 5 is a rear elevation view of the upper arm with the rear endcap removed showing a support bearing for supporting the telescopic movement of the inner tube relative to the outer tube, the service delivery lines routed through the upper arm being removed for clarity.

FIG. 5 shows a support bearing 250 for supporting the telescopic movement of the inner tube 70 relative to the outer tube 72 of the upper arm 50. The support bearing 250 includes a pair of laterally-spaced lower rollers 252 coupled to the outer tube 72 by respective pivot pins 254. The lower rollers 252 rotatably support a pair of laterally-spaced longitudinally-extending lower rods 256 coupled to the inner tube 70. The support bearing 250 further includes a pair of laterally-spaced upper rollers 258 coupled to the inner tube 70 by respective pivot pins 260. The upper rollers 258 rotatably support a pair of laterally-spaced longitudinally-extending upper rods 262 coupled to the outer tube 70. The upper rollers 258 are supported by a pair of laterally-spaced brackets 264 secured to the inner tube 70 by bolts 266. Each lower roller 252 is rotatably received in a channel 268 formed in the outer tube 72. Each upper roller 258 is rotatably received in a channel 270 formed in the associated bracket 264. In the illustrated embodiment, the rods 256, 262 have projecting portions and the rollers 252, 258 have complementary circumferential groove portions in which the respective projecting portions of the rods 256, 262 are received. Alternatively, the rollers 252, 258 may have circumferential projecting portions and the rods 256, 262 may have complementary groove portions in which the respective projecting portions of the rollers 252, 258 are received.

Figure 7:
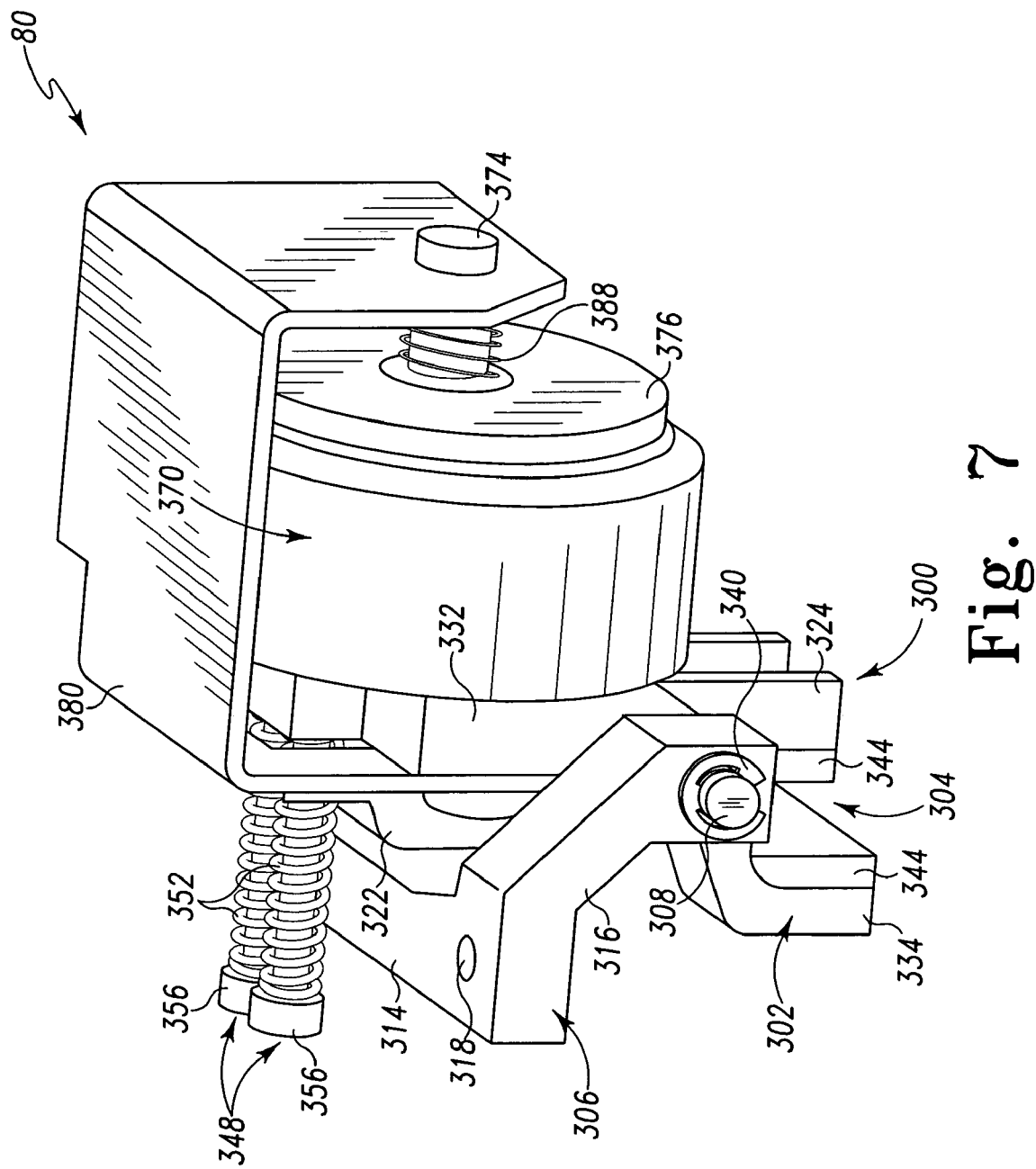
FIG. 7 is a front perspective view of the first brake showing an inner and outer brake arms forming a scissors-type clamp, brake pads attached to the brake arms, and a solenoid responsive to a control signal for pivoting the brake arms in a direction that spreads apart the brake pads to release the brake.
Figure 8:
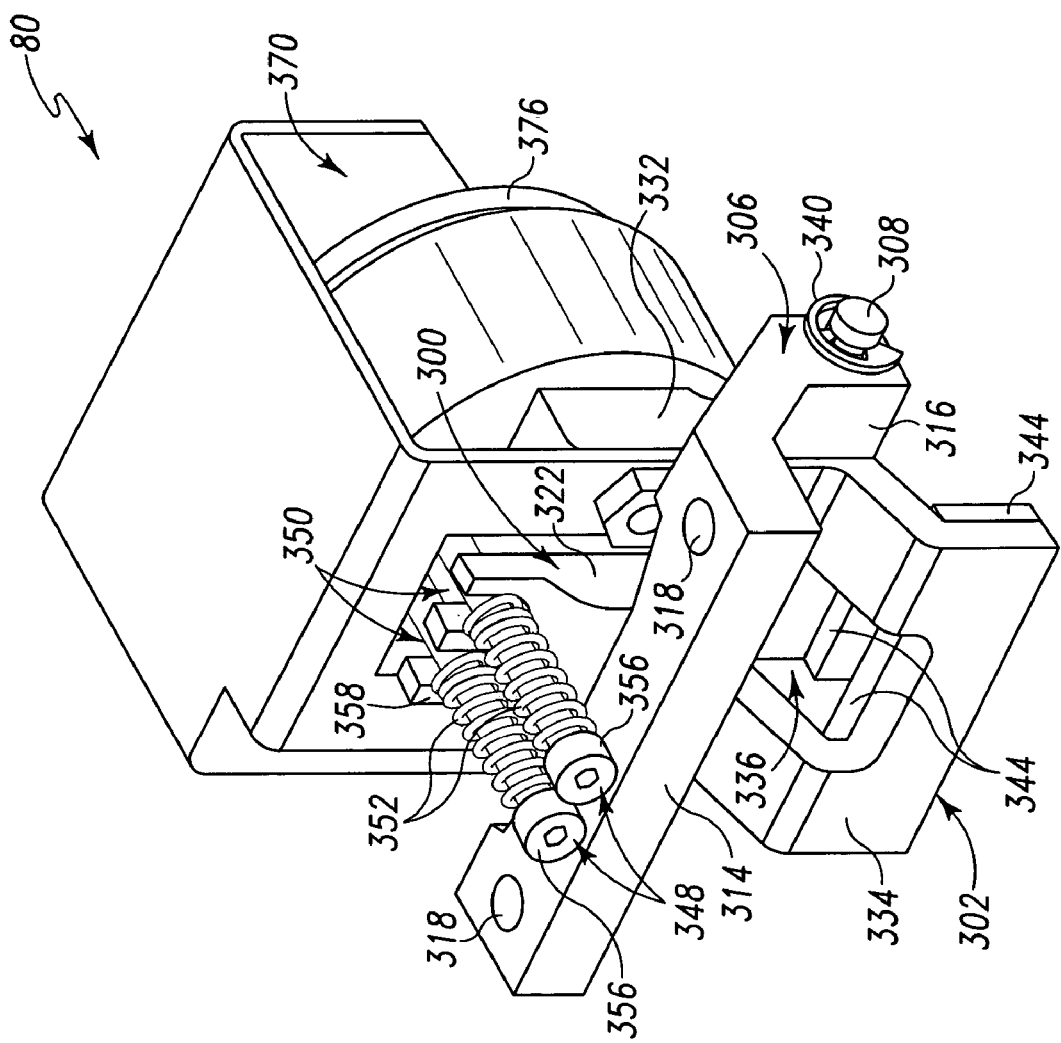
FIG. 8 is a rear perspective view of the first brake.
Figure 9:
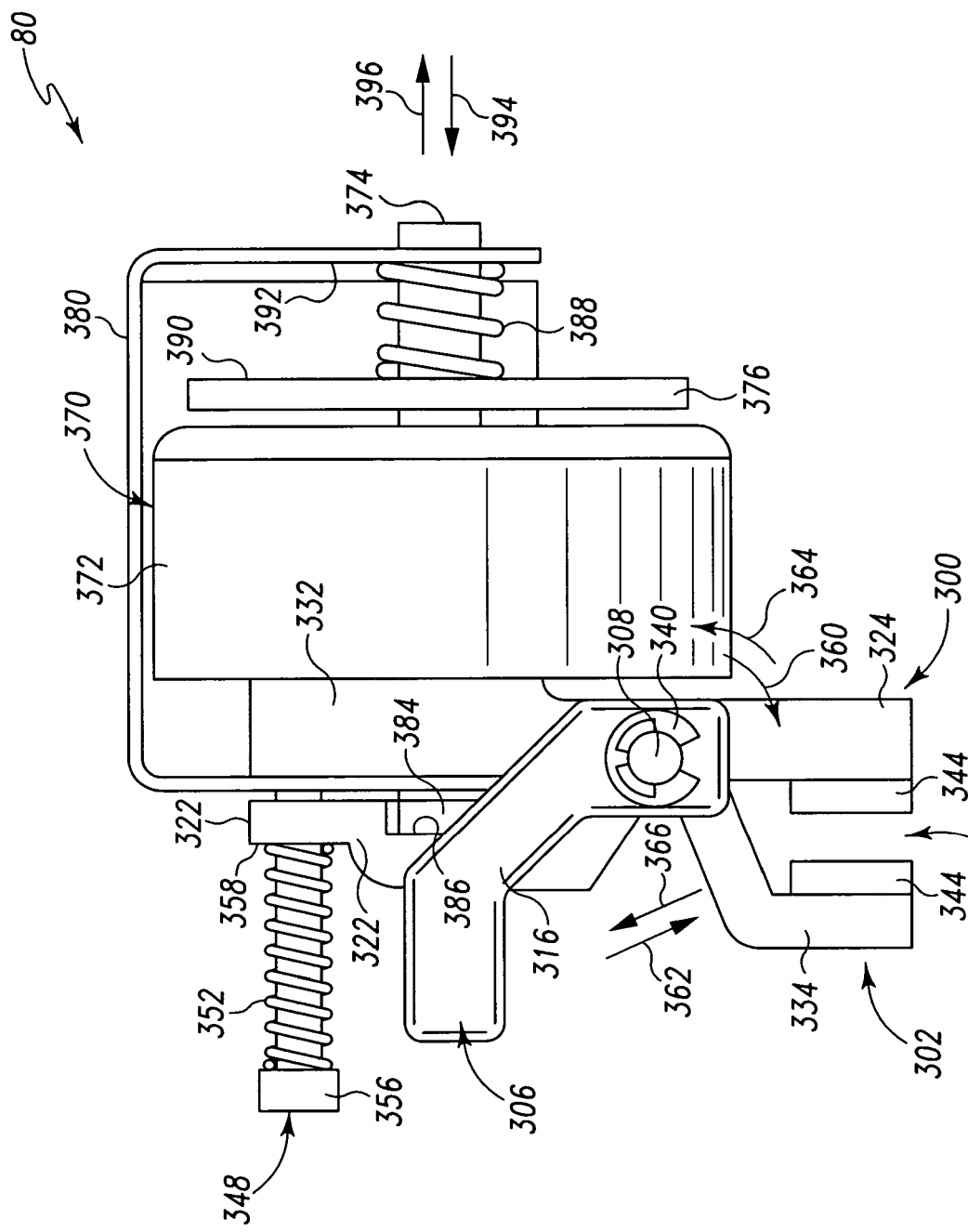
FIG. 9 is a front elevation view of the first brake.

The first brake 80 is normally in the braking position to impede the telescopic movement of the inner tube 70 relative to the outer tube 72. The brake 80 is movable to its releasing positions in response to the actuation of either or both of the brake release switches 76 (FIG. 13) on the handle 64 of the service head 60 to allow the telescopic movement of the inner tube 70 relative to the outer tube 72. As shown in FIGS. 7-9, the brake 80 includes inner and outer brake members 300, 302 coupled to a pivot bracket 306 to pivot about a longitudinally-extending pivot pin 308. The pivot bracket 306 is bolted to a longitudinally-extending step portion 310 of the inner tube 70 by a pair of bolts 312. The inner and outer brake members 300, 302 form a scissors-type clamp 304 that applies a braking force to the outer tube 72 when the brake 80 is not energized (i.e., when the power to the brake is off). As shown in FIG. 5, the brake 80 is mounted just forward of the left rear bearing support bracket 264.

The pivot bracket 306 includes a longitudinally-extending central portion 314 and a pair of end portions 316 that are longitudinally spaced apart. The end portions 316 extend inwardly and downwardly from the central portion 314. The central portion 314 and the end portions 316 of the pivot bracket 306 form a generally U-shaped configuration when viewed from the top. A step portion 310 (FIG. 6) of the inner tube 70 has a pair of threaded openings which are aligned with a pair of oversized openings 318 (FIGS. 7, 8) in the central portion 314 of the pivot bracket 306. The bolts 312 extend through the oversized openings 318 in the central portion 314 of the pivot bracket 306 and are screwed in the threaded openings in the step portion 310 of the inner tube 70 to secure the pivot bracket 306 to the inner tube 70.

As shown in FIGS. 7-9, the inner brake member 300 includes a central hub portion (obscured from view in FIGS. 7-9), an arm portion 322 that extends outwardly and upwardly from the central hub portion and a leg portion 324 that extends downwardly from the central hub portion. The outer brake member 302 includes a central hub portion (obscured from view in FIGS. 7-9), an arm portion 332 that extends upwardly from the central hub portion and a leg portion 334 that extends outwardly and downwardly from the central hub portion. As shown in FIG. 8, the leg portion 334 of the outer brake member 302 has a cutout 336 through which the leg portion 324 of the inner arm 300 extends.

As shown in FIG. 9, the upwardly-extending arm portion 322 of the inner brake member 300 is disposed laterally outwardly of the upwardly-extending arm portion 332 of the outer brake member 302. The downwardly-extending leg portion 324 of the inner brake member 300 is disposed laterally inwardly of the downwardly-extending leg portion 334 of the outer brake member 302. The hub portions of the inner and outer brake members 300, 302 have longitudinally-extending bores which are aligned with the longitudinally-extending bores in the end portions 316 of the pivot bracket 306. The pivot pin 308 extends through the bores in the end portions 316 of the pivot bracket 306 and the hub portions of the inner and outer brake members 300, 302. End portions of the pivot pins 308 have circumferential grooves for receiving associated C-washers 340.

Figure 6:
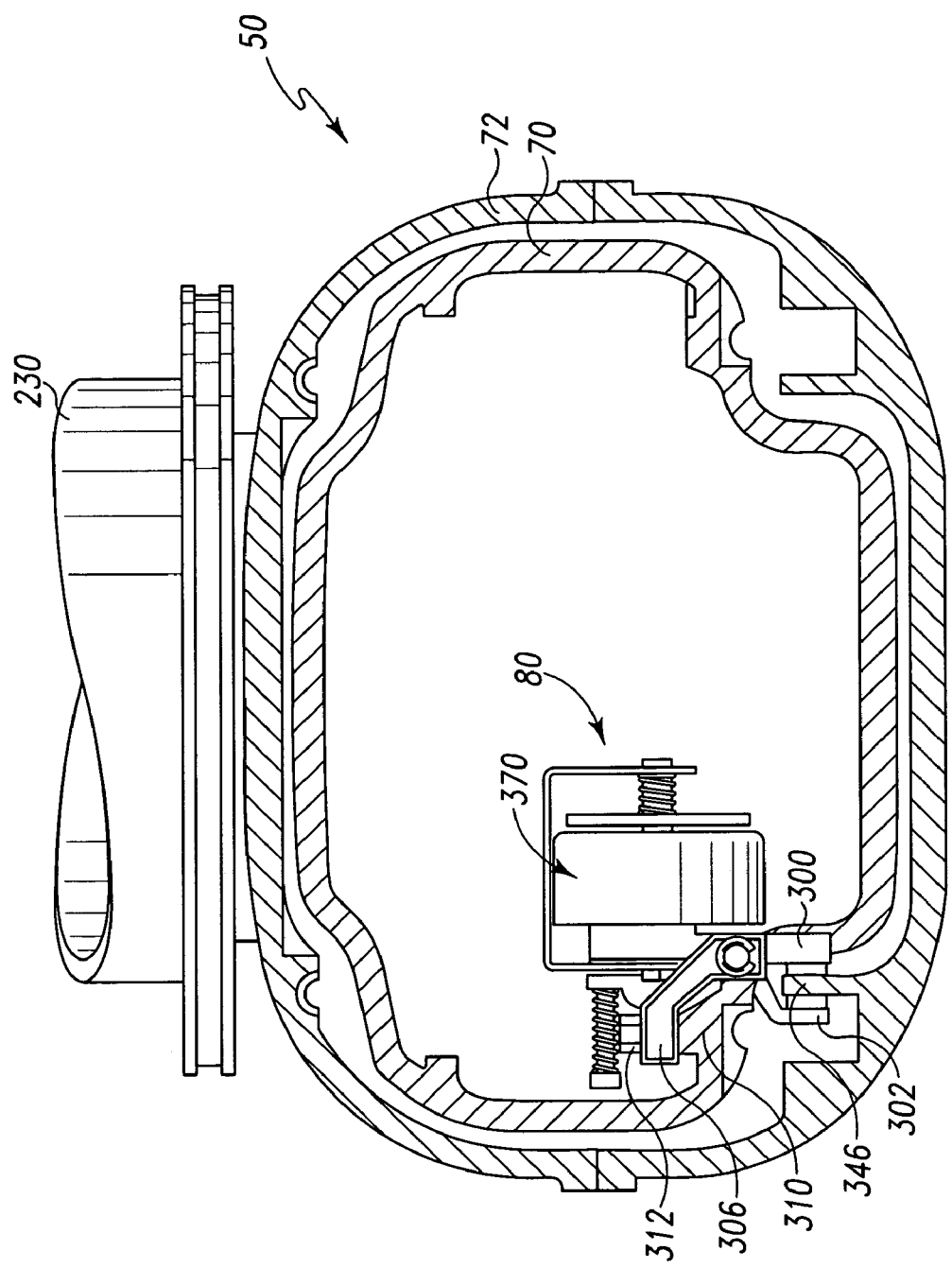
FIG. 6 is a rear elevation view, similar to FIG. 5, of the upper arm with the rear endcap removed showing a first brake to impede the telescopic movement of the inner tube relative to the outer tube.

The confronting surfaces 342 of the downwardly-extending leg portions 324, 334 of the inner and outer brake members 300, 302 carry respective brake pads 344. As shown in FIG. 6, the downwardly-extending leg portions 324, 334 with the brake pads 344 straddle a longitudinally and upwardly-extending portion 346 of the outer tube 72. The downwardly-extending leg portion 324 of the inner brake member 300 is disposed laterally inwardly of the upwardly-extending portion 346 of the outer tube 72. The downwardly-extending leg portion 334 of the outer brake member 302 is disposed laterally outwardly of the upwardly-extending portion 346 of the outer tube 72.

The upwardly-extending arm portion 332 of the outer brake member 302 is disposed laterally inwardly of the upwardly-extending arm portion 322 of the inner brake member 300. As shown in FIGS. 7-9, a pair of shoulder bolts 348 are screwed into outwardly-facing threaded openings (not shown) in the upwardly-extending arm portion 332 of the outer brake member 302. The bolts 348 extend outwardly through respective slots 350 (FIG. 8) in the upwardly-extending arm portion 322 of the inner arm 300. A coil spring 352 is disposed about a shaft portion of each shoulder bolt 348. Each spring 352 is held in a state of compression between a head portion 356 of the bolt 348 and the outwardly-facing surface 358 of the upwardly-extending arm portion 322 of the inner brake member 300 as shown in FIG. 9. The two compression springs 352 bias the inner and outer brake members 300, 302 carrying the brake pads 344 to pivot about the pivot pin 308 in clockwise and counterclockwise directions 360, 362 (FIG. 9), respectively. The clockwise and counterclockwise rotation of the respective brake members 300, 302 clamps the upwardly-extending portion 346 (FIG. 6) of the outer tube 72 between the brake pads 344 to impede the telescopic movement of the inner tube 70 relative to the outer tube 72.

As shown in FIGS. 7-9, the brake 80 includes a solenoid 370 which when energized causes the inner and outer brake members 300, 302 to pivot in the opposite directions—namely, the counterclockwise and clockwise directions 364, 366 (FIG. 9), respectively. This spreads apart the brake pads 344 to allow the telescopic movement of the inner tube 70 relative to the outer tube 72. The solenoid 370 includes a winding 372 supported by the pivot bracket 306. The winding 372 has an oversized bore through which a plunger 374 carrying a solenoid plate 376 extends. The solenoid 370 is enclosed in a protective shield 380. The brake controller 102 generates a brake release signal in response to the actuation of either or both of the brake release switches 76 (FIG. 13). The brake release signal is applied to the winding 372 through leads 382 (FIG. 3) which are routed through the support structure 54 and through the upper telescopic arm 50. The plunger 374, the solenoid plate 376, and the shield 380 are all made from non-magnetic materials.

As shown in FIG. 9, a distal end 384 of the plunger 374 rests against the inwardly-facing surface 386 of the upwardly-extending arm portion 322 of the inner brake member 300. A light coil spring 388 is disposed about the plunger 374 between the confronting surfaces 390, 392 of the solenoid plate 376 and the shield 380 to keep the plunger 374 biased toward the upwardly-extending arm portion 322 of the inner brake member 300. When the winding 372 is not energized, the compression springs 352 bias the inner and outer brake members 300, 302 to pivot in the clockwise and counterclockwise directions 360, 362, respectively. This biases the plunger 374 to move in a rightwardly direction 394 to cause the solenoid plate 376 to be spaced from the winding 372.

When the winding 372 is energized in response to the actuation of either or both of the brake release switches 76 (FIG. 13), the winding 372 attracts the solenoid plate 376 causing the plunger 374 to move in a leftward direction 396 against the force of the compression springs 352. As the plunger 374 moves in the leftward direction 396, the inner and outer brake members 300, 302 rotate in the counterclockwise and clockwise directions 364, 366 (FIG. 9), respectively, to cause the brake pads 344 to move away from the upwardly-extending portion 346 of the outer tube 72. This releases the braking force applied to the outer tube 72 to allow the inner and outer tubes 70, 72 of the upper arm 50 to telescope relative to each other.

The brake releasing force exerted by the winding 372 on the solenoid plate 376 when either or both of the brake release switches 76 (FIG. 13) are actuated must be strong enough to overcome the braking force exerted by the compression springs 352 on the inner and outer arms 300, 302. The braking force exerted by the compression springs 352 on the inner and outer arms 300, 302 can be changed by changing the spring rates of the compression springs 352, or by changing the initial compression of the compression springs 352, or by changing the vertical spacing between the shoulder bolts 348 and the pivot pin 308. The solenoid 370 is of the type commercially available from Ledex as Model No. P/N 187789-032.

The arm system 20 includes a second brake 82 movable between a braking position to impede the pivoting movement of the upper arm 50 about the first axis 56 and a releasing position to allow the pivoting movement of the upper arm 50 about the first axis 56. The arm system 20 includes a fourth brake 182 movable between a braking position to impede the pivoting movement of the lower arm 150 about the third axis 156 and a releasing position to allow the pivoting movement of the lower arm 150 about the third axis 156. Since, the brakes 82, 182 are similar in construction, only one of the brakes 82, 182, namely, the second brake 82, will be described below.

The brake 82 is normally in the braking position to impede the pivoting movement of the upper arm 50 about the pivot axis 56. The brake 82 is movable to its releasing positions in response to the actuation of either or both of the brake release switches 76 (FIG. 13) to allow the pivoting movement of the upper arm 50 about the pivot axis 56. As shown in FIG. 10, the brake 82 is mounted on the support casting 224 of the upper cantilevered portion 122 (FIG. 2) of the support structure 54. The brake 82 includes a pinion 400 (FIG. 12) driven by a ring gear 402. The ring gear 402 is coupled to the upper end 232 of the pivot tube 230 for rotation therewith about the pivot axis 56. The pivot tube 220 is, in turn, coupled to the upper arm 50 for rotation therewith about the pivot axis 56.

As shown diagrammatically in FIG. 12, the brake 82 includes a solenoid 404 having a winding 406 disposed in a housing 408 and a plunger 410 carrying a solenoid plate 412 at a lower end thereof. The pinion 400 is coupled to the upper end of the plunger 410. The lower end of the plunger 410 has a circumferential groove for receiving a C-washer 413 to prevent the solenoid plate 412 from falling off. The brake 82 includes a fixed plate 414 which is secured to the housing 408 by suitable fasteners, such as rivets or bolts (not shown). Spacers 416 are provided between the underside of the fixed plate 414 and the topside of the housing 408. A friction plate 418 is situated beneath the underside of the fixed plate 414. The plunger 410 extends through oversized bores 420, 422 in the fixed plate 414 and the solenoid plate 412, respectively. The plunger 410 has a hex portion that is received in a complementary hex cutout in the friction plate 418, so that rotation of the plunger 410 causes rotation of the friction plate 418. Compression springs 424 extend between the underside of the solenoid plate 412 and the topside of the housing 408. When the winding 406 is not energized, the compression springs 424 clamp the friction plate 418 between the solenoid plate 412 and the fixed plate 414 to impede the pivoting movement of the upper arm 50 about the pivot axis 56.

The brake controller 102 generates a brake release signal in response to the actuation of either or both of the brake release switches 76 (FIG. 13). The brake release signal is applied to the winding 406 through leads 426 (FIG. 3) which are routed through the vertical-extending portion 120 of the support structure 54 and through the upper cantilevered portion 122. The winding 406, when energized in response to the actuation of either or both of the brake release switches 76 (FIG. 13), pulls the solenoid plate 412 away from the fixed plate 414 against the force of the compression springs 424. This frees the friction plate 418, thereby allowing the upper arm 50 to pivot about the pivot axis 56. The plunger 410 and the solenoid plate 412 are constructed from non-magnetic materials. The brake 82 is of the type commercially available from Deltran PT as Model No. P/N BRP-30AS.

The arm system 20 includes a third brake 84 movable between a braking position to impede the pivoting movement of the first service head 60 about the second axis 66 and a releasing position to allow the pivoting movement of the first service head 60 about the second axis 66. The arm system 20 includes a fifth brake 184 movable between a braking position to impede the pivoting movement of the second service head 160 about the fourth axis 166 and a releasing position to allow the pivoting movement of the second service head 160 about the fourth axis 166. Since, the third and fifth brakes 84, 184 pivotally mounting the service heads 60, 160 to the respective upper and lower arms 50, 150 are similar in construction, only one of the two brakes 84, 184, namely, the third brake 84, will be described below.

Figure 11:
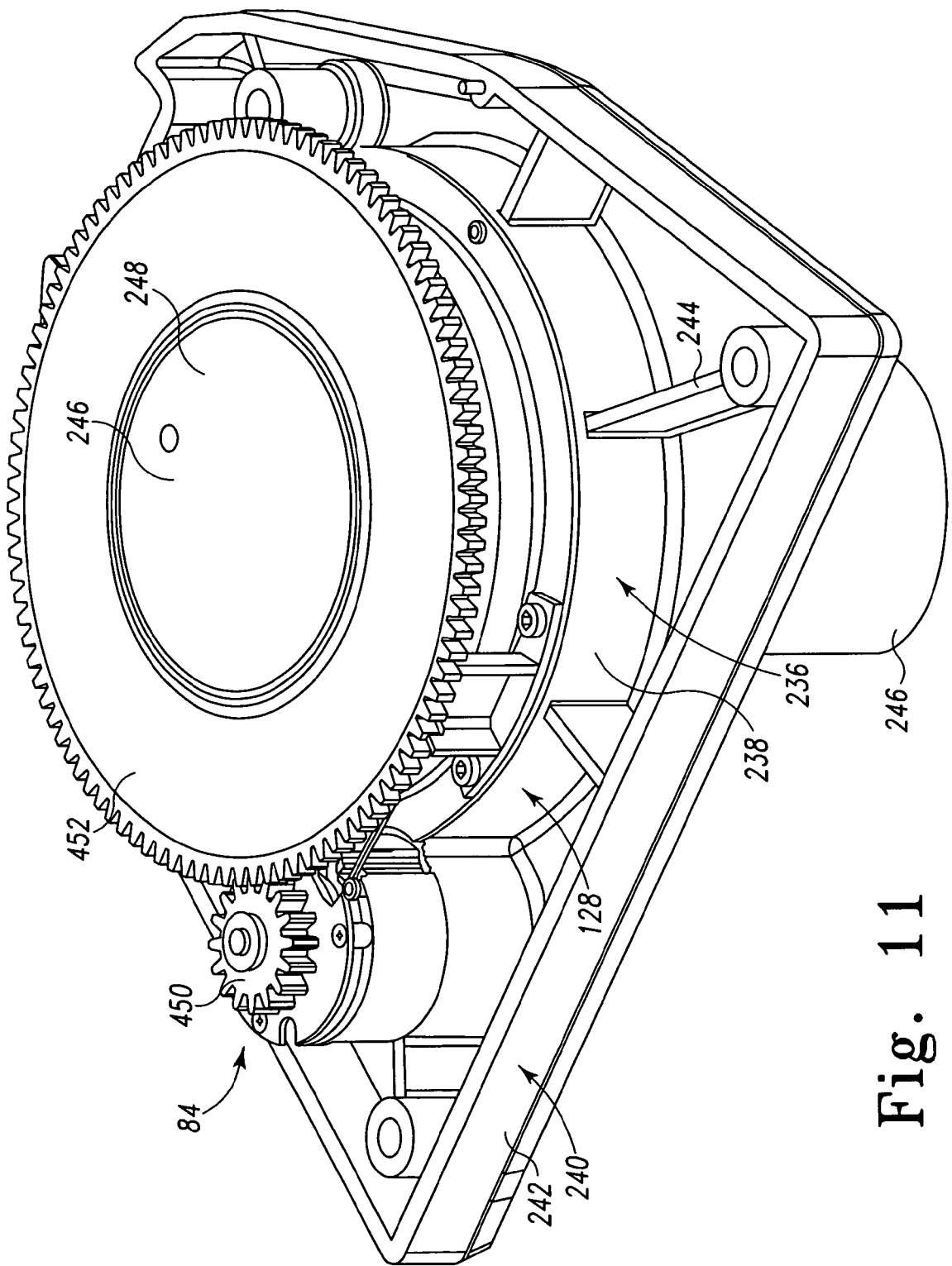
FIG. 11 is a bottom perspective view of a service head support casting, a pivot tube extending downwardly from the upper arm and coupled to the service head support casting, a ring gear coupled to a lower end of the pivot tube, and a third brake coupled to the ring gear to impede the pivoting movement of the service head relative to the service head support casting.

The brake 84 is normally in the braking position to impede the pivoting movement of the service head 60 relative to the upper arm 50. The brake 84 is movable to its releasing positions in response to the actuation of either or both of the brake release switches 76 (FIG. 13) to allow the pivoting movement of the service head 60 relative to the upper arm 50. As shown in FIG. 11, which is a bottom view, the brake 84 is mounted on the upper casting 240 of the service head 60 for rotation therewith about the pivot axis 66. The brake 84 includes a pinion 450 driven by a ring gear 452. The ring gear 452 is coupled to the lower end 248 of the downwardly-extending pivot tube 246. The pivot tube 246 is, in turn, coupled to the underside of the upper arm 50. The pivot tube 246 and the ring gear 452 coupled thereto do not pivot with the service head 60 as the service head 60 pivots about the axis 66.

As diagrammatically shown in FIG. 12, the brake 84, like the brake 82, includes a solenoid 404 having a winding 406 disposed in a housing 408 and a plunger 410 carrying a solenoid plate 412 at a lower end thereof. The pinion 450 is coupled to the upper end of the plunger 410. The lower end of the plunger 410 has a circumferential groove for receiving a C-washer 413 to prevent the solenoid plate 412 from falling off. The brake 84 includes a fixed plate 414 which is secured to the housing 408 by suitable fasteners, such as rivets or bolts (not shown). Spacers 416 are provided between the underside of the fixed plate 414 and the topside of the housing 408. A friction plate 418 is secured to the underside of the fixed plate 414. The plunger 410 extends through oversized bores 420, 422 in the fixed plate 414 and the solenoid plate 412, respectively. The plunger 410 has a hex portion that is received in a complementary hex cutout in the friction plate 418, so that rotation of the plunger 410 causes rotation of the friction plate 418. Compression springs 424 extend between the underside of the solenoid plate 412 and the topside of the housing 408. When the winding 406 is not energized, the solenoid plate 412 is pressed against the friction plate 418 by compression springs 424 to impede the pivoting movement of the service head 60 about the pivot axis 66.

The brake controller 102 generates a brake release signal in response to the actuation of either or both of the brake release switches 76 (FIG. 13). The brake release signal is applied to the winding 406 of the brake 84 through leads 428 (FIG. 3) which are routed through the vertical-extending portion 120 of the support structure 54, through the upper cantilevered portion 122, through the upper arm pivot 126, through the upper arm and through the pivot 128. The winding 406, when energized in response to the actuation of either or both of the brake release switches 76 (FIG. 13), pulls the solenoid plate 412 away from the fixed plate 414 against the force of the compression springs 424. This frees the friction plate 418, thereby allowing the service head 60 to pivot about the pivot axis 66. The plunger 410 and the solenoid plate 412 are constructed from non-magnetic material. The solenoid plate 412 is constructed from magnetic material. The brake 84 is of the type commercially available from Deltran PT as Model No. P/N BRP-23V.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

There is a plurality of advantages of the present invention arising from the various features of the embodiments described herein. It will be noted that alternative embodiments of the present invention may not include all of the features described yet still benefit from at least some of the advantages of such features. Those of ordinary skill in the art may readily devise their own implementations of a device that incorporates one or more of the features of the present invention and fall within the spirit and scope of the present invention as defined by the appended claims.

The invention claimed is:

1. An arm system comprising
   a first arm supported by a support structure and having a first portion and a second portion coupled to the first portion for extension and retraction relative to the first portion along a longitudinal axis, the first and second portions having a first plurality of service delivery lines routed therethrough, and
   a first brake movable in response to a first user input between a braking position to impede the longitudinal movement of the second portion relative to the first portion and a releasing position to allow the longitudinal movement of the second portion relative to the first portion, wherein the first brake is positioned within and coupled to the first portion, and wherein the first brake includes first and second brake members biased to clamp around an inwardly-extending leg of the second portion in the braking position.

2. The system of claim 1, wherein the first brake is configured to normally impede the longitudinal movement of the second portion relative to the first portion, and the first brake is movable to the releasing position in response to the actuation of a brake release switch to allow the longitudinal movement of the second portion relative to the first portion.

3. The system of claim 1, wherein the first portion has a proximal end coupled to the support structure to pivot about a first axis, and the system further comprising a second brake movable in response to the first user input between a braking position to impede the pivoting movement of the first arm about the first axis and a releasing position to allow the pivoting movement of the first arm about the first axis.

4. The system of claim 3, wherein the first and second brakes in the absence of the first user input impede the longitudinal movement of the second portion relative to the first portion and the pivoting movement of the first arm about the first axis, and the first and second brakes in the presence of the first user input allow the longitudinal movement of the second portion relative to the first portion and the pivoting movement of the first arm about the first axis.

5. The system of claim 3, further comprising a first service head coupled to the second portion for longitudinal movement therewith and to pivot about a second axis and a third brake movable in response to the first user input between a braking position to impede the pivoting movement of the first service head about the second axis and a releasing position to allow the pivoting movement of the first service head about the second axis, wherein the first service head has a first plurality of service connectors coupled to the associated service delivery lines routed through the first arm.

6. The system of claim 5, wherein brakes in the absence of the first user input impede the longitudinal movement of first service head and the pivoting movement of the first arm and the first service head, and the brakes in the presence of the first user input allow the longitudinal movement of the first service head and the pivoting movement of the first arm and the first service head.

7. The system of claim 6, further comprising a controller that signals the first, second and third brakes to move to their respective releasing positions in response to the actuation of a first brake release switch.

8. The system of claim 5, wherein the first and second axes each extend generally vertically.

9. The system of claim 5, further comprising a second arm having a proximal end coupled to the support structure to pivot about a third axis, and a fourth brake movable in response to a second user input between a braking position to impede the pivoting movement of the second arm about the third axis and a releasing position to allow the pivoting movement of the second arm about the third axis, wherein the second arm has a second plurality of service delivery lines routed therethrough.

10. The system of claim 9, further comprising a second service head coupled to a distal end of the second arm to pivot about a fourth axis, and a fifth brake movable in response to the second user input between a braking position to impede the pivoting movement of the second service head about the fourth axis and a releasing position to allow the pivoting movement of the second service head about the fourth axis, wherein the second service head has a second plurality of service connectors coupled to the associated service delivery lines routed through the second arm.

11. The system of claim 10, wherein the fourth and fifth brakes in the absence of the second user input impede the pivoting movement of the second arm about the third axis and the pivoting movement of the second service head about the fourth axis, and the fourth and fifth brakes in the presence of the second user input allow the pivoting movement of the second arm about the third axis and the pivoting movement of the second service head about the fourth axis.

12. The system of claim 11, further comprising a controller that signals the fourth and fifth brakes to move to their respective releasing positions in response to the actuation of a second brake release switch, wherein the second service head has a handle and the second brake release switch is extending from an inwardly-facing surface of the handle of the second service head.

13. The system of claim 10, wherein the first, second, third and fourth axes each extend generally vertically.

14. The system of claim 5, wherein the first service head has a handle, a first brake release switch extends from an inwardly-facing surface of the handle, and the first, second and third brakes move to their respective releasing positions in response to the actuation of the brake release switch.

15. The system of claim 1, further comprising a first service head coupled to the second portion of the first arm, wherein the first service head has a handle, a first brake release switch extends from an inwardly-facing surface of the handle, and the first brake moves to its releasing position in response to the actuation of the brake release switch.

16. An arm system comprising
a first arm coupled to a support structure to pivot about a first axis, the first arm having a first portion and a second portion coupled to the first portion for extension and retraction relative to the first portion along a longitudinal axis,
a patient care equipment support coupled to the second portion,
a first brake movable in response to a first user input between a braking position to impede the longitudinal movement of the second portion relative to the first portion and a releasing position to allow the longitudinal movement of the second portion relative to the first portion, wherein the first brake is positioned within and coupled to the first portion, and wherein the first brake includes first and second brake members biased to clamp around an inwardly-extending leg of the second portion in the braking position, and
a second brake movable in response to the first user input between a braking position to impede the pivoting movement of the first arm about the first axis and a releasing position to allow the pivoting movement of the first arm about the first axis, wherein the second brake includes a pinion coupled to the first arm, a plunger coupled to the pinion for rotation therewith, and first and second brake members clamped around a plate mounted to the plunger to prevent rotation of the plunger in the braking position.

17. The system of claim 16, wherein the patient care equipment support comprises a first service head coupled to the second portion for longitudinal movement therewith and to pivot about a second axis and a third brake movable in response to the first user input between a braking position to impede the pivoting movement of the first service head about the second axis and a releasing position to allow the pivoting movement of the first service head about the second axis, wherein the first service head has a first plurality of service connectors coupled to associated service delivery lines routed through the first arm.

18. The system of claim 16, wherein the first brake further includes a first spring biasing the first brake member toward the inwardly-extending leg of the second portion and a second spring biasing the second brake member toward the inwardly-extending leg.

19. The system of claim 18, wherein the first brake further includes a pivot bracket coupled to the first portion, and wherein the first and second brake members are pivotably coupled to the pivot bracket about a single pivot pin.

20. The system of claim 18, wherein the first brake further includes a solenoid which, when energized, causes the first and second brake members to move away from the inwardly-extending leg of the second portion.

21. The system of claim 16, wherein at least one of the first and second brake members of the second brake is biased in a direction toward the plate mounted to the plunger.

22. The system of claim 21, wherein the second brake further includes a solenoid which, when energized, causes at least one of the first and second brake members of the second brake to move away from the plate.

23. The system of claim 22, wherein the first brake member of the second brake is fixed relative to the first arm, and the second brake member is configured to move generally linearly toward and away from the plate and the first brake member to move the second brake between the braking and the release positions.

24. An arm system comprising
a first arm coupled to a support structure to pivot about a first axis,
a first patient care equipment support coupled to the first arm to pivot about a second, vertical axis defined along a length of the patient care equipment support,
a first brake movable in response to a first user input between a braking position to impede the pivoting movement of the first arm about the first axis and a releasing position to allow the pivoting movement of the first arm about the first axis, wherein the first brake includes a pinion coupled to the first arm, a plunger coupled to the pinion for rotation therewith, and first and second brake members clamped around a plate mounted to the plunger to prevent rotation of the plunger in the braking position, and
a second brake movable in response to the first user input between a braking position to impede the pivoting movement of the patient care equipment support about the second axis and a releasing position to allow the pivoting movement of the patient care equipment support about the second axis, wherein the second brake includes a pinion coupled to the first arm, a plunger coupled to the pinion for rotation therewith, and first and second brake members clamped around a plate mounted to the plunger to prevent rotation of the plunger in the braking position.

25. The system of claim 24, wherein the first and second brakes in the absence of the first user input impede the pivoting movement of the first arm about the first axis and the pivoting movement of the first patient care equipment support about the second axis, and the first and second brakes in the presence of the first user input allow the pivoting movement of the first arm about the first axis and the pivoting movement of the patient care equipment support about the second axis.

26. The system of claim 24, wherein the first arm has a first portion and a second portion coupled to the first portion for extension and retraction relative to the first portion along a longitudinal axis, the first patient care equipment support is coupled to the second portion for longitudinal movement therewith and the first and second portions have a first plurality of service delivery lines routed therethrough.

27. The system of claim 26, further comprising a third brake movable in response to the first user input between a braking position to impede the longitudinal movement of the first service head and a releasing position to allow the longitudinal movement of the first service head.

28. The system of claim 27, wherein the brakes in the absence of first user input impede the longitudinal movement of the service head and the pivoting movement of the arm and the service head, and the brakes in the presence of the first user input allow the longitudinal movement of the service head and the pivoting movement of the arm and the service head.

29. The system of claim 24, further comprising an annular member coupled to the first arm for rotation therewith about the first axis and a first stop movably coupled to the annular member, wherein the support structure includes a second stop configured to engage the first stop as the first arm is rotated in a first direction.

30. The system of claim 29, further comprising a third stop movably coupled to the annular member, wherein the support structure includes a fourth stop configured to engage the third stop as the first arm is rotated in a second opposite direction.

31. The system of claim 30, wherein the angular positions of the first and third stops relative to the annular member are variable to vary a swing range of the first arm in the first and second directions.

32. An arm system comprising
a first arm having a proximal end coupled to a support structure to pivot about a first axis,
a first plurality of service delivery lines routed downwardly through the support structure and then outwardly through the first arm,
a second arm having a proximal end coupled to the support structure below the first arm to pivot about a second axis,
a second plurality of service delivery lines routed upwardly through the support structure and then outwardly through the second arm,
a first service head depending downwardly from a distal end of the first arm such that the first plurality of service delivery lines are routed downwardly through the first service head from the distal end of the first arm, and
a second service head depending downwardly from a distal end of the second arm such that the second plurality of service delivery lines are routed downwardly through the second service head from the distal end of the second arm.

33. The system of claim 32, wherein the support structure has a first downwardly-extending pivot and a second upwardly-extending pivot, the proximal end of the first arm is coupled to the first downwardly-extending pivot to pivot about the first axis, the first plurality of service delivery lines are routed downwardly through the first downwardly-extending pivot and then outwardly through the first arm, the proximal end of the second arm is coupled to the second upwardly-extending pivot to pivot about the second axis, and the second plurality of service delivery lines are routed upwardly through the second upwardly-extending pivot and then outwardly through the second arm.

34. The system of claim 33, wherein the support structure has a vertically-extending portion, a first outwardly-extending portion, and a second outwardly-extending portion located below the first outwardly-extending portion, the first downwardly-extending pivot extends downwardly from the first outwardly-extending portion, the first plurality of service delivery lines are routed downwardly through the vertically-extending portion, outwardly though the first outwardly-extending portion, downwardly though the first downwardly-extending pivot and then outwardly though the first arm, the second upwardly-extending pivot extends upwardly from the second outwardly-extending portion, and the second plurality of service delivery lines are routed downwardly through the vertically-extending portion, outwardly though the second outwardly-extending portion, upwardly though the second upwardly-extending pivot and then outwardly though the second arm.

35. The system of claim 32, wherein the first arm has a first portion and a second portion coupled to the first portion for extension and retraction relative to the first portion along a longitudinal axis, and the first and second portions have the first plurality of service delivery lines routed therethrough.

36. The system of claim 32, wherein the first service head has a first plurality of service connectors coupled to the associated service delivery lines routed through the first arm.

37. The system of claim 32, wherein the second service head has a second plurality of service connectors coupled to the associated service delivery lines routed through the second arm.

* * * * *